US011303642B2

(12) United States Patent
Dunjic et al.

(10) Patent No.: US 11,303,642 B2
(45) Date of Patent: Apr. 12, 2022

(54) DYNAMIC MANAGEMENT OF CONSENT AND PERMISSIONING BETWEEN EXECUTED APPLICATIONS AND PROGRAMMATIC INTERFACES

(71) Applicant: The Toronto-Dominion Bank, Toronto (CA)

(72) Inventors: Milos Dunjic, Oakville (CA); Arthur Carroll Chow, Markham (CA); David Samuel Tax, Toronto (CA); Armon Rouhani, Toronto (CA); Keith Sanjay Ajmani, Toronto (CA); Gregory Albert Kliewer, Barrie (CA); Anthony Haituyen Nguyen, Toronto (CA); Martin Albert Lozon, London (CA); Kareem El-Onsi, Toronto (CA); Ashkan Alavi-Harati, Markham (CA); Arun Victor Jagga, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 313 days.

(21) Appl. No.: 16/429,719

(22) Filed: Jun. 3, 2019

(65) Prior Publication Data

US 2020/0382510 A1    Dec. 3, 2020

(51) Int. Cl.
*H04L 29/06* (2006.01)
*H04L 9/06* (2006.01)

(52) U.S. Cl.
CPC ............ *H04L 63/102* (2013.01); *H04L 63/04* (2013.01); *H04L 63/20* (2013.01); *H04L 9/0643* (2013.01); *H04L 2209/38* (2013.01)

(58) Field of Classification Search
CPC ............................ H04L 63/102; H04L 63/04
USPC ........................................................... 726/4
See application file for complete search history.

(56) References Cited

U.S. PATENT DOCUMENTS

| 9,172,621 B1 * | 10/2015 | Dippenaar ............ H04L 41/22 |
| 2013/0346302 A1 | 12/2013 | Purves et al. |
| 2014/0006347 A1 | 1/2014 | Qureshi et al. |
| 2014/0314895 A1 | 7/2014 | Higgins et al. |
| 2014/0229305 A1 | 8/2014 | Ellan |

(Continued)

FOREIGN PATENT DOCUMENTS

WO    WO 2016189311 A1    12/2016

*Primary Examiner* — Anthony D Brown
(74) *Attorney, Agent, or Firm* — Duane Morris LLP

(57) ABSTRACT

The disclosed exemplary embodiments include computer-implemented systems, apparatuses, and processes that dynamically manage consent, permissioning, and trust between computing systems that maintain confidential data and unrelated third-party applications. By way of example, an apparatus may obtain interaction data that identifies an interaction between an application program executed at a first computing system and a programmatic interface of a second computing system. Based on the interaction data, the apparatus may generate outcome data characterizing a probability that the requested access to the data element is inconsistent with an access permission granted to the executed application program, and may modify the access permission in accordance with the outcome data. The apparatus may also perform that generate permissioning data indicative of the modified access permission and that store the permissioning data within a locally accessible or cloud-based repository.

20 Claims, 7 Drawing Sheets

(56) References Cited

U.S. PATENT DOCUMENTS

| | | |
|---|---|---|
| 2017/0251013 A1 | 8/2017 | Kirti et al. |
| 2017/0264619 A1 | 9/2017 | Narayanaswamy et al. |
| 2017/0289134 A1 | 10/2017 | Bradley et al. |
| 2017/0346804 A1 | 11/2017 | Beecham et al. |
| 2018/0077609 A1* | 3/2018 | Lauer ............... H04L 67/26 |
| 2018/0196694 A1 | 7/2018 | Banerjee et al. |

* cited by examiner

DYNAMIC MANAGEMENT OF CONSENT AND PERMISSIONING BETWEEN EXECUTED APPLICATIONS AND PROGRAMMATIC INTERFACES

TECHNICAL FIELD

The disclosed embodiments generally relate to computer-implemented systems and processes that dynamically manage consent and permissioning between executable applications and programmatic interfaces in a computing environment.

BACKGROUND

Many computing environments include multiple, network-connected devices and systems that maintain, access, or distribute confidential data across various communications networks. For example, in an open banking environment, these computing systems may maintain programmatic interfaces capable of establishing communications, and exchanging data, with one or more third-party applications executed by additional network-connected devices and systems. For example, a third-party application, such as an executable financial management application, may access elements of confidential customer and account data maintained on behalf of a customer by computing systems of one or more financial institutions, and may perform operations to process, aggregate, or display portions of the obtained customer and account data on a digital interface, e.g., via the customer's mobile device

SUMMARY

In some examples, an apparatus may include a communications unit, a memory storing instructions, and at least one processor coupled to the communications unit and the memory. The at least one processor may be configured to execute the instructions to obtain interaction data that identifies an interaction between an application program executed at a first computing system and a programmatic interface of a second computing system. The interaction may include a request to access an element of data, and the request may be generated by the executed application program and received by the programmatic interface. Based on the interaction data, the at least one processor may also be configured to generate outcome data characterizing a probability that the requested access to the data element is inconsistent with an access permission granted to the executed application program, and to modify the access permission in accordance with the outcome data. The at least one processor may be further configured to perform operations that generate permissioning data indicative of the modified access permission and that store the permissioning data within the memory.

In other example, a computer-implemented method may include obtaining, by at least one processor, interaction data that identifies an interaction between an application program executed at a first computing system and a programmatic interface of a second computing system. The interaction may include a request to access an element of data, and the request may be generated by the executed application program and received by the programmatic interface. Based on the interaction data, the computer-implemented method may also include generating, by the at least one processor, outcome data characterizing a probability that the requested access to the data element is inconsistent with an access permission granted to the executed application program, and modifying, by the at least one processor, the access permission in accordance with the outcome data. Further, the computer-implemented method may also include, by the at least one processor, performing operations that generate permissioning data indicative of the modified access permission and that store the permissioning data within a data repository.

Additionally, and in some examples, a tangible, non-transitory computer-readable medium storing instructions that, when executed by at least one processor, cause the at least one processor to perform a method that includes obtaining interaction data that identifies an interaction between an application program executed at a first computing system and a programmatic interface of a second computing system. The interaction may include a request to access an element of data, and the request may be generated by the executed application program and received by the programmatic interface. Based on the interaction data, the method may also include generating outcome data characterizing a probability that the requested access to the data element is inconsistent with an access permission granted to the executed application program, and modifying the access permission in accordance with the outcome data. The method may also include performing operations that generate permissioning data indicative of the modified access permission and that store the permissioning data within a data repository.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

Like reference numbers and designations in the various drawings indicate like elements.

DETAILED DESCRIPTION

Figure 1:
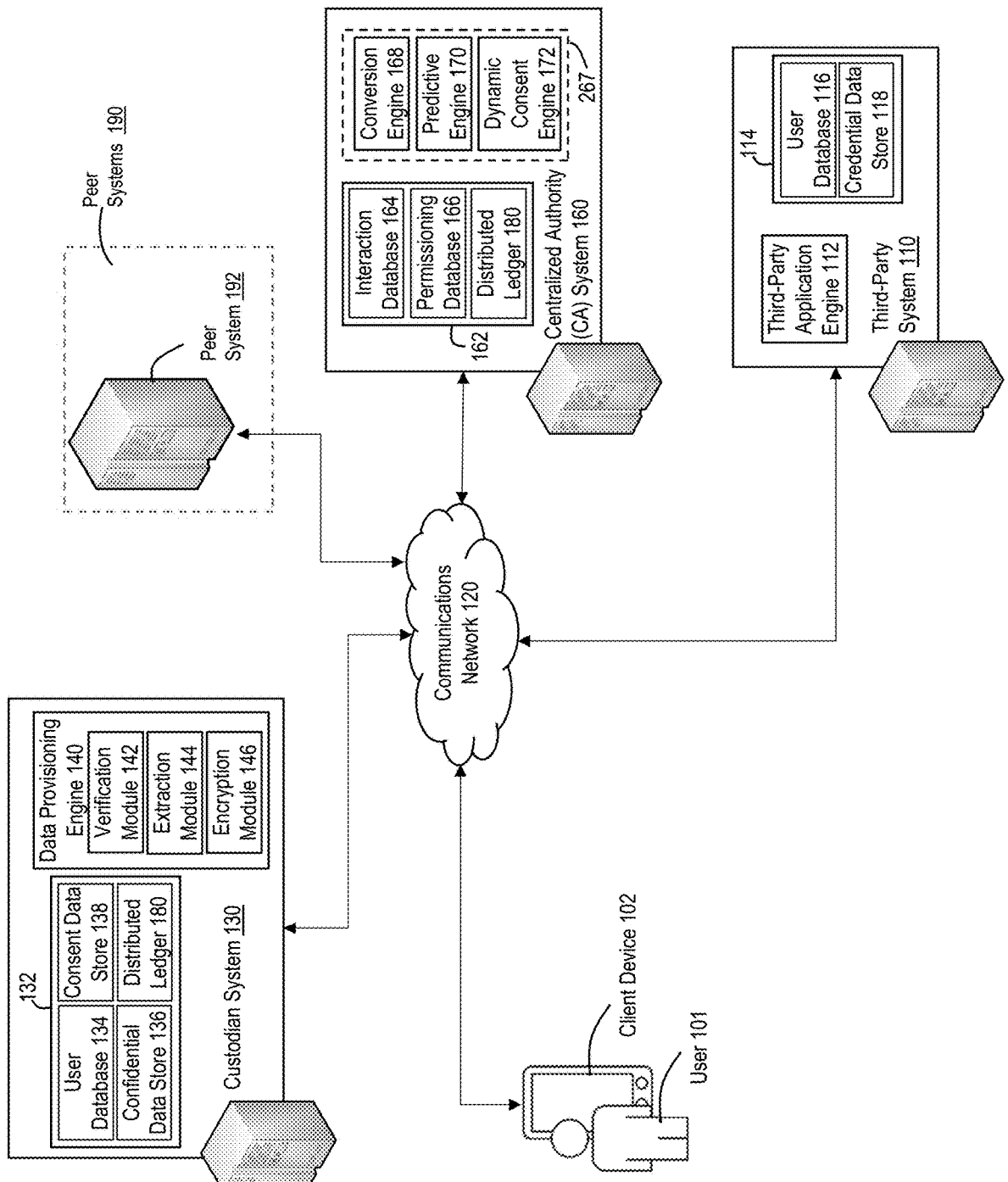
FIG. 1 is a block diagram of an exemplary computing environment, in accordance with some embodiments.

This specification relates to computer-implemented processes that, among other things, dynamically manage consent, permissioning, and trust between computing systems that maintain confidential data and unrelated third-party applications within a computing environment. By way of example, the computing environment may include one or more network-connected computing systems (e.g., "custodian" systems) that maintain elements of sensitive and confidential data on behalf of one or more users. The elements of sensitive and confidential data may include, but are not limited to, data characterizing an interaction between a user and a financial institution (e.g., account data characterizing a balance of or transactions involving a deposit account, and investment account, or a credit card account, etc.), data characterizing an interaction between a user and a healthcare provider (e.g., an electronic medical record, etc.), or data characterizing an interaction between a user and a governmental, legal, or regulatory entity (e.g., a prior tax return, a tax assessment, a driving record).

As described herein, one or more of the custodian systems may perform operations that provision selected elements of the sensitive and confidential data to one or more additional computing systems or devices operating within the computing environment, e.g., based on a request generated by an executed application program transmitted programmatically to the one or more custodian systems through a secure, programmatic interface, such as an application programming interface (API). By way of example, a custodian system may provision an application program (e.g., a mobile application) to a network-connected device operated by a corresponding user (e.g., a client device), and upon execution by the client device, the mobile application may perform operations that establish a secure channel of communications with an API established and maintained by the custodian system and that request from, and receive, one or more elements of the confidential data maintained by the custodian system across the secure communications channel, e.g., for presentation to the user through a digital interface.

In other instances, the distributed computing environment may also include one or more network-connected computing systems operated by third-parties unrelated to the custodian systems, e.g., "third-party" systems, which may perform operations that request, on behalf of corresponding users, access to selected elements of the confidential data maintained by the custodian systems. For example, the custodian system may be associated with or operated by a financial institution, and may maintain any of the exemplary elements of confidential data described herein, which characterize an interaction between the financial institution and corresponding customers. Further, one of the third-party systems may be associated with a financial management application or a financial aggregator application that, when provisioned to and executed by a device of a user (e.g., a client device), causes the third-party system to request access to elements of the confidential data maintained on behalf of the user at one or more of the custodian systems and upon receipt of the requested elements of confidential data, to aggregate the requested elements of confidential data for presentation at the client device, e.g., within a digital interface generated by the executed financial management application or financial aggregator application.

To ensure that the access requested by the third-party system comports with a level or type of access granted to the third-party system by the user, the third-party system, the client device, and each of the one or more custodian systems may perform operations that collectively implement a token-based authentication and consent process, such as an OAuth protocol. By way of example, and to access the elements of confidential data maintained on behalf of the user at a corresponding one of the custodian systems, the third-party system may transmit a request that includes data identifying the user, the third-party system, and the requested access (e.g., the requested elements of confidential data) across a communications network to a secure, programmatic interface established and maintained by the corresponding custodian system, e.g., to a network address of an application programming interface (API).

In some instances, and in response to the received request, the corresponding custodian system may establish a direct communications channel with the client device, and may transmit a notification to the client device that, when presented within a digital interface, identifies the access requested by the third-party system and prompts the user to consent to the access requested by the third-party system by providing one or more authentication credentials as inputs to the digital interface. Based on a successful authentication of the user's identity, and based on the user's consent to the requested access by the third-party system, the corresponding custodian system may generate a digital token, cryptogram, hash value, or other element of cryptographic data, such as an OAuth token, indicative of the successful authentication and of the user's consent to the requested access, and may store the digital token, cryptogram, hash value, or other element of cryptographic data (e.g., the OAuth token) within a tangible, non-transitory memory in conjunction with the data identifying the third-party system and characterizing the requested access.

Further, the corresponding custodian system may also perform operations that transmit the digital token, cryptogram, hash value, or other element of cryptographic data (e.g., the OAuth token) across the communication network to the third-party system for storage within one or more tangible, non-transitory memories. In some instances, the third-party system may perform operations that package the OAuth token into additional requests for confidential data maintained on behalf of the user by the corresponding custodian system, and based on a verification of the OAuth token, the corresponding custodian system may provision the requested elements of confidential data to the third-party system (e.g., in accordance with the user's granted consent).

In some instances, and as described herein, the collective implementation of these token-based authentication and consent process, such as the OAuth protocol, enables a custodian system to provision one or more requested elements of confidentially maintained data to a third-party system in accordance with a level or type of access previously granted to that third-party system by the user. None of these token-based authentication or consent processes, however, provide any indication of a likelihood that the third-party system with manage the confidential data in accordance with the user's granted consent and with one or more conditions enforced by custodian system 130, much less any information characterizing a prior use, or misuse, of confidential data by the third-party system. Indeed, absent a public disclosure of any prior misuse or breach by the third-party system, or absent information from a computing systems operated by regulatory, legal, or governmental entity identifying such a prior misuse or breach, these existing token-based authentication and consent processes provide no mechanism that enables the custodian system to determine, in real-time, likelihood that a request for confidential data will result in a misuse or breach of that confidential data by the third-party system, and to dynamically adapt, in real-time, a provisioning of one or more elements of the confidential user data to the third-party system in accordance with the determined likelihood.

Building on the existing token-based authorization and consent protocols described herein, such as the OAuth protocol, a computing system associated with or operated by a centralized authority (e.g., a centralized authority (CA) system) may perform operations that monitor an interaction between one or more third-party systems and a programmatic interface established and maintained by one or more custodian systems, which maintain confidential data on behalf of corresponding users. In some exemplary embodiments, and based on an application of one or more adaptively trained predictive models to structured input data characterizing a particular interaction between a third-party system and the secure, programmatic interface of a corresponding one of the custodian systems (e.g., reflecting a submitted request to access confidential data maintained on behalf of a particular user), the CA system may generate predicted outcome data indicative of a likelihood that the third-party system will manage a requested confidential data in accordance with a level of consent granted by the particular user and with one or more terms or conditions imposed by the corresponding custodian system.

In some exemplary embodiments, the CA system may also generate permissioning data identifying one or more access limitations or restrictions imposed in the third-party system by the CA system, and store the permissioning data within one or more locally accessible or cloud-based data repositories. Additionally, or alternatively, the CA system may also perform operations that record the permissioning data within one or more additional ledger blocks of a distributed ledger in conjunction with a unique access credential associated with the third-party computing system. Further, a latest, longest version of the distributed ledger, which includes the one or more additional ledger blocks, may be distributed to computing systems within the distributed computing environment that participate in a permissioned, distributed-ledger network that includes, but is not limited to, the CA system and each of the custodian systems described herein. By recording the access credential associated with the third-party system and the permissioning data identifying imposed access limitations or restrictions onto the distributed ledger, certain of the disclosed exemplary embodiments generate a not only reliable and cryptographically secure indicator of a current likelihood that a third-party system will manage requested elements of confidential data in accordance with a level of consent granted by a particular user and with one or more conditions enforced by a corresponding custodian system, but also an immutable record of a temporal evolution of the use, or misuse, of elements of confidential data by the third-party computing system.

Certain of these exemplary embodiments may be implemented by a custodian system in conjunction with one or more of token-based authentication and consent protocols described herein, and may enable the custodian system to perform operations that dynamically provision requested elements of confidential data to a third-party system in accordance with both a prior access granted by a corresponding user, and immutably recorded elements of distributed ledger data characterizing a likelihood that the third-party system will misuse the requested elements of confidential data. Further, the implementation of one or more of these exemplary processes by the custodian system may limit occurrences of unauthorized access and breach of confidential data maintained by the custodian system, as the immutably recorded elements of the distributed ledger data enable the custodian system to perform operations that dynamically adjust, in real-time, the accessibility of the requested confidential data to the third-party system.

I. Exemplary Computing Environments

FIG. 1 illustrate components of an exemplary computing environment 100, in accordance with some exemplary embodiments. For example, as illustrated in FIG. 1, environment 100 may include one or more computing devices, such as client device 102 operated by user 101. Environment 100 may also include one or more computing systems, such as, but not limited to, a third-party system 110, a custodian system 130, a centralized authority (CA) system 160, and one or more peer systems 190, including peer system 190. In some instances, each of client device 102, third-party system 110, custodian system 130, CA system 160, and peer systems 190 (including peer system 192), may be interconnected across one or more wired or wireless communications networks, such as communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some embodiments, client device 102 may include a computing device having one or more tangible, non-transitory memories that store data and/or software instructions, and one or more processors coupled to the one or more tangible, non-transitory memories and configured to execute the software instructions. As described herein, client device 102 may be associated with or operated by a corresponding user, such as user 101, and examples of client device 102 include, but are not limited to, as a smart phone, tablet computer, a desktop computer, a gaming console, a wearable device, or another computing device, system, or apparatus associated with user 101.

The one or more tangible, non-transitory memories may, for example, store application programs, application modules, and other elements of code executable by the one or more processors. For instance, although not illustrated in FIG. 1, client device 102 may maintain, within the one or more tangible, non-transitory memories, an executable mobile application, which may be developed by a corresponding third-party and provisioned to client device 102 by a computing system operated by that corresponding third party, e.g., third-party system 110. Examples of the provisioned mobile application may include, but are not limited to, executable financial management applications, personal financial aggregator applications, and other applications that, when executed by the one or processors of client device 102, perform operations to request and obtain elements of confidential data maintained on behalf of user 101 by one or more computing systems, e.g., custodian system 130.

In some instances, the one or more tangible, non-transitory memories may also maintain additional executable applications, such as, but not limited to one or more executable web browsers (e.g., Google Chrome™, etc.). The disclosed embodiments, however, are not limited to these exemplary application programs, and in other examples, the one or more tangible, non-transitory memories may maintain any additional or alternate application programs, application modules, or other elements of code executable by client device 102. Further, the one or more tangible, non-transitory memories of client device 102 may also maintain additional elements of data that uniquely identify client device 102 (e.g., a media access control (MAC) address of client device 102, an Internet Protocol (IP) address, etc.), that uniquely identify the executable mobile application (e.g., a unique application cryptogram, etc.), and/or that facilitate or support the execution of the provisioned mobile application (e.g., one or more alphanumeric or biometric authentication credentials of user 101, etc.).

Referring back to FIG. 1, each of third-party system 110, custodian system 130, CA system 160, and peer systems 190 (including peer system 192), may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. Further, in some examples, each of third-party system 110, custodian system 130, CA system 160, and peer systems 190 (including peer system 192) may each include a communications unit or interface coupled to the one or more processors for accommodating wired or wireless communication across network 120 with any of the additional network-connected systems or devices described herein, e.g., a transceiver device.

In some instances, each of third-party system 110, custodian system 130, CA system 160, and peer systems 190 (including peer system 192) may correspond to a discrete computing system, as described herein. In other instances, one or more of third-party system 110, custodian system 130, CA system 160, and peer systems 190 may correspond to a distributed system that includes computing components distributed across one or more networks, such as network 120, or other networks, such as those provided or maintained by cloud-service providers (e.g., Google Cloud™, Microsoft Azure™, etc.).

By way of example, and as described herein, the distributed computing components of CA system 160 may collectively perform operations that establish an artificial neural network capable of, among other things, adaptively and dynamically processing portions of structured input data to predict a likelihood that third-party system 110 will manage the requested confidential data in accordance with a level of consent granted by user 101 and with one or more terms or conditions enforced by custodian system 130, and to generate output data, e.g., an application-specific credential, indicative of that predicted likelihood. The disclosed embodiments are, however, not limited to these exemplary distributed systems, and in further instances, third-party system 110, custodian system 130, CA system 160, and peer systems 190 (including peer system 192) may include computing components disposed within any additional or alternate number or type of computing systems or across any appropriate network.

Third-party system 110 may perform operations support an execution of one or more application programs provisioned to network-connected devices operating within environment 100, such as an execution of the mobile application provisioned to client device 102. By way of example, and as described herein, the provisioned mobile application may correspond to a financial management application, a personal financial aggregator application, or other application that, when executed by client device 102, perform operations to request and obtain elements of confidential data maintained on behalf of user 101 by one or more computing systems, e.g., custodian system 130.

In some instances, third-party system 110 may receive a request for the elements of confidential user data from client device 102 (e.g., as generated programmatically upon execution of the provisioned mobile application), and may process the received request to identify one or more computing systems that maintain corresponding elements of the requested confidential user data, such as custodian system 130, described herein. Further, third-party system 110 may perform any of the exemplary processes described herein to access and obtain the requested elements of confidential user data on behalf of user 101 (e.g., as maintained locally by custodian system 130) in accordance with not only a level of consent previously granted to third-party system 110 by user 101 (e.g., through a token-based authentication and consent processes, such as an OAuth protocol), but also in accordance with a determined likelihood that third-party system 110 will manage the requested elements of confidential user data in accordance with the granted level of consent and with one or more terms and conditions enforced by custodian system 130.

To facilitate a performance of these and other exemplary processes, third-party system 110 may maintain, within one or more tangible, non-transitory memories, an executable third-party application engine 112, and a data repository 114, which includes a user database 116 and a credential data store 118. In some instances, third-party application engine 112, when executed by the one or more processors of third-party system 110, may perform any of the exemplary processes described herein that support the execution of the provisioned mobile application by client device 102, and the execution of other local third-party applications provisioned to additional, or alternative, network-connected devices operating within environment 100.

In some instances, user database 116 may include data records that identify and characterize one or more registered users of third-party system 110, e.g., user 101. By way of example, and as described herein, a "registered user" of third-party system 110 may be associated with, or may operate, a "registered device" that executes a third-party application provisioned by third-party system 110 (e.g., user 101 may correspond to a registered user operating a registered device, e.g., registered client device 102, that executes the provisioned mobile application). In some instances, and for each of the registered users, the data records of user database 116 may include a corresponding user identifier (e.g., an alphanumeric login credential assigned to user 101 by third-party system 110, etc.), data that uniquely identifies one or more registered devices (e.g., an IP address or a MAC address, of registered client device 102, etc.), and additionally, or alternatively, a unique identifier of a corresponding one of the provisioned third-party applications (e.g., a third-party application cryptogram associated with the mobile application executed by client device 102, etc.)

Further, credential data store 118 may include, for each of the registered users of third-party system 110, one or more discrete elements of consent data indicative of a successful outcome of one or more token-based authentication and consent processes, e.g., an OAuth protocol implemented by third-party system 110, a corresponding registered device, and one or more custodian systems operating within environment 100, such as custodian system 130. Each of the discrete elements of consent data may, for example, include a digital token, cryptogram, hash value, or other element of cryptographic data, such as an OAuth token, indicative of a successful authentication of the identity of a registered user, and of an access permission granted by the registered user, during the OAuth processes implemented between third-party system 110, a corresponding one of the registered devices, and one of the custodian systems. Further, each of the discrete elements of consent data maintained within credential data store 118 may be associated with a corresponding one of the user identifiers described herein and as such, may be linked to one or more of the data records maintained within user database 116

By way of example, and for a request, by third-party system 110, to access the confidential user data maintained at custodian system 130 on behalf of user 101, credential data store 118 may include an OAuth token generated by custodian system 130 in response to a successful outcome of the OAuth protocol implemented by third-party system 110, client device 102, and custodian system 130. In some instances, the implementation of the OAuth protocol by third-party system 110, client device 102, and custodian system 130 may allow user 101 to provide express consent for the level of access to the confidential data requested by executed third-party application engine 112. Additionally, or alternatively, the implementation of the OAuth protocol may also allow user 101 to modify a scope of the requested access, e.g., to limit an ability of executed third-party application engine 112 to access certain types of elements of confidential user data, or to deny permission for executed third-party application engine 112 to distribute portions of the accessed confidential user data to other parties. As described herein, the OAuth token may confirm a successful authentication of the identity of user 101 by custodian system 130, and may further reflect the level of provisioned consent to the requested access by third-party system 110, e.g., as indicated by additional elements of consent data maintained locally by custodian system 130.

Credential data store 118 may also maintain an application-specific credential provisioned to third-party system 110 by CA system 160 using any of the exemplary processes described herein. The application-specific credential may, in some instances, may correspond to a unique identifier of executed third-party application engine 112 recognizable to one or more computing systems operating within environment 100, such as custodian system 130 and CA system 160, and when recorded onto a cryptographically secure and immutable distributed ledger (e.g., by CA system 160), may enable one or more computing systems within environment 100, such as custodian system 130, to access one or more ledger blocks of the distributed ledger and obtain data characterizing restrictions or limitations on an ability of executed third-party application engine 112 to access or process elements of confidential user data, e.g., as maintained by custodian system 130. Examples of the application-specific credential include, but are not limited to, an alphanumeric character string, a hash value, a random number, a cryptogram, or other element of cryptographic data.

Referring back to FIG. 1, custodian system 130 may maintain elements of confidential user data within the one or more tangible, non-transitory memories, e.g., confidential user data maintained on behalf of user 101. For instance, custodian system 130 may be associated with, or operated by, a financial institution that provides financial services to user 101 and other customers, and the confidential user data may include, among other things, transaction or balance data involving one or more of the checking, savings, other deposit accounts, or lines of credits, data characterizing a composition or balance of an investment account, data characterizing one or more mortgages or unsecured loans held by user 101, or sensitive data characterizing one or more prior tax returns.

The disclosed exemplary embodiments are, however, not limited to confidential user data characterizing one or more financial services provided to, or on behalf of, user 101. In other examples, custodian system 130 may be associated with associate with a healthcare provider, a pharmacy, or a provider of health or life insurance, the confidential user data may include, among other things, electronic medical records maintained on behalf of user 101, records of prescribed pharmaceuticals, or values of various metrics characterizing a current health of user 101. Additionally, or alternatively, custodian system 130 may be further associated with one or more governmental, legal, or regulatory entities, and the confidential user data may characterize or describe an interaction between user 101 and these entities, e.g., a tax return, judicial record, vehicle registration, etc.

In some instances, custodian system 130 may perform any of the exemplary processes described herein to provision one or more requested elements of the confidential user data to third-party system 110 in accordance with both: (i) a level of consent previously granted to third-party system 110 by user 101 (e.g., through a token-based authentication and consent processes, such as an OAuth protocol); and (ii) a determined likelihood that third-party system 110 will manage the requested elements of confidential data in accordance with the granted level of consent and with one or more conditions enforced by custodian system 130 (e.g., based on permissioning data recorded onto a cryptographically secure and immutable distributed ledger in conjunction with the corresponding access credential). To facilitate a performance of these and other exemplary processes, custodian system 130 may maintain, within one or more tangible, non-transitory memories, a data repository 132, which includes a user database 134, a confidential data store 136, and a consent data store 138.

For example, user database 134 may include data records that identify and characterize one or more users of custodian system 130, e.g., user 101. In some instances, and for each of the users, the data records of user database 134 may include a corresponding user identifier (e.g., an alphanumeric login credential assigned to user 101 by custodian system 130), and data that uniquely identifies one or more devices associated with or operated by that user 101, such as, but not limited to an IP address, a MAC address, or a mobile telephone number assigned to client device 102). Further, the data records of user database 134 may also link each of the user identifiers (and in some instances, the corresponding unique device identifier) to one or more elements of profile information corresponding to users of custodian system 130, e.g., user 101.

Further, confidential data store 136 may maintain elements of confidential user data on behalf of user 101 and other users of custodian system 130. For example, and for user 101, confidential data store 136 may include one or more data records that identify and characterize a balance of transaction history of one or more deposit accounts or brokerage accounts issued to user 101 (e.g., by the financial institution that operates custodian system 130) and additionally, or alternatively, income and tax withholding information that facilitates a preparation of one or more tax returns (e.g., information on an IRS Form W-2, 1099-DIV, etc.). In some instances, each of the data records of confidential data store 136 may also include a corresponding user identifier (e.g., an alphanumeric login credential assigned to user 101 by custodian system 130) and/or a corresponding device identifier (e.g., the IP address, MAC address, or mobile telephone number of client device 102), and as such, each of the data records confidential data store 136 may also be linked to, and associated with, one or more corresponding data records within user database 134.

Consent data store 138 may maintain, for one or more third-party systems operating within environment 100, information indicative of a successful outcome of one or more token-based authentication and consent processes, e.g., an OAuth protocol, implemented the custodian system 130, the one or more third-party systems, and corresponding network-connected device operating within environment 100. By way of example, consent data store 138 may maintain a digital token, cryptogram, hash value, or other element of cryptographic data, e.g., an OAuth token, indicative of not only a successful authentication of user 101 by custodian system 130, but also of a type or level of access to confidential data granted by user 101 to third-party system 110. Further, in some instances, each of the digital tokens, cryptograms, hash values, or other elements of cryptographic data, e.g., that OAuth token, may be linked to and associated with a corresponding element of consent data that identifies the corresponding user and third-party system, and that characterizes the type or level of granted access (e.g., a particular type of data, a particular use of data, a temporal restriction, a geographic restriction regarding a location of the third-party system, etc.).

Custodian system 130 may also maintain, within the one or more tangible, non-transitory memories one or more executable application programs, such as, but not limited to a data provisioning engine 140 that includes a verification module 142, an extraction module 144, and an encryption module 146. When executed by the one or more processors of custodian system 130, verification module 142 may perform any of the exemplary processes described herein to verify that a request, by third-party system 110, to access one or more elements of confidential user data is consistent with a level of consent previously granted to third-party system 110 by user 101 (e.g., through a token-based authentication and consent processes, such as an OAuth protocol) and a determined likelihood that third-party system 110 will manage the requested elements of confidential data in accordance with the granted level of consent and with one or more conditions enforced by custodian system 130 (e.g., as specified by permissioning data associated with a corresponding access credential).

When executed by the one or more processors of custodian system 130, extraction module 144 may perform any of the exemplary processes described herein to extract one or more requested elements of confidential user data from user database 134 and/or confidential data store 136. Further, and when executed by the one or more processors of custodian system 130, encryption module 148 may perform any of the exemplary processes described herein to encrypts the extracted elements of confidential user data for transfer across network 120 to client device 102, e.g., via a secure, programmatic interface maintained by to the executed mobile application. By way of example, encryption module 148 may encrypt the extracted elements of confidential user data using a public cryptographic key, a symmetric cryptographic key, or a homomorphic public cryptographic key associated with the mobile application executed at client device 102 and available to custodian system 130. Additionally, in some instances, and to facilitate a verification of an integrity of the encrypted elements of confidential user data, executed encryption module 146 may also perform operations that apply a digital signature to the encrypted elements of confidential data, e.g., using a public cryptographic key associated with custodian system 130.

CA system 160 may perform operations that monitor and collect data, e.g., "interaction" data, characterizing an interaction between one or more third-party applications, e.g., executed third-party application engine 112, and corresponding programmatic interfaces established and maintained network-connected computing systems operating within a distributed computing environment, e.g., custodian system 130 that maintains elements of confidential user data on behalf of user 101 and other users. By way of example, CA system 160 may receive interaction data characterizing a current and ongoing interaction between executed third-party application engine 112 and a secure, programmatic interface maintained by custodian system 130, e.g., resulting from a submitted request for one or more elements of confidential user data maintained by custodian system 130.

Based on an application of one or more of the dynamic, adaptively-trained predictive models described herein to structured portions of the received interaction data, CA system 160 may perform operations that generate predicted outcome data indicative of a likelihood that executed third-party application engine 112 will manage the requested elements of confidential user data in accordance with an access granted by user 101 (e.g., as represented by a corresponding OAuth token) and with one or more conditions enforced by custodian system 130. In some instances, CA system 160 may perform any of the exemplary processes described herein determine a modification to the level of access previously granted to executed third-party application engine 112, including a revocation of that granted access, in accordance with the predicted outcome data, and to generate one or more elements of permissioning data that reflect the determined modification to, or the revocation of, the previously granted access.

As described herein, CA system 160 may return the modified consent data to custodian system 130, which may perform operations that provision all or a subset of the requested confidential data to executed third-party application engine 112 in accordance with the permissioning data, or alternatively, that decline to provision any of the requested elements of confidential user data to executed third-party application engine 112 based on the permissioning data. Further, in some instances, CA system 160 may perform any of the exemplary processes described herein that, either alone or in conjunction with one or more peer systems, record the modified consent data onto one or more ledger blocks of a cryptographically secure distributed ledger in conjunction within the application-specific credential that uniquely identifies executed third-party application engine 112. By immutably recording the access credential and the permissioning data within the one or more ledger blocks of cryptographically secure distributed ledger, certain of the disclosed exemplary embodiments may enable each participant system in a distributed-ledger network, including custodian system 130 and CA system 160, to access elements of recorded data associated with executed third-party application engine 112 (e.g., via the corresponding application-specific credential) and not only identify an access restrictions currently imposed on executed third-party application engine 112, but also monitor a temporal evolution of these imposed access restrictions.

CA system 160 may also perform operations that store the received interaction data, which characterizes the interaction between executed third-party application engine 112 and the secure, programmatic interface maintained by custodian system 130, and the predicted outcome data within one of the more of the tangible, non-transitory memories. In some instances, CA system 160 may also receive data characterizing an actual outcome of the provisioning of the requested elements of confidential user data to executed third-party application engine 112 by custodian system 130, e.g., from client device 102 or from computing systems operated by one or more governmental, legal, or regulatory entities. The actual outcome data may, for example, identify a use or distribution of the confidential user data by executed third-party application engine 112 that is inconsistent with the access granted by user 101 or with one or more terms or conditions enforced by custodian system 130. Alternatively, the actual outcome data may confirm that executed third-party application engine 112 utilized the confidential user data in accordance with both the granted access and the enforced terms or conditions. In some instances, CA system 160 may perform operations that train, and adaptively improve, one or more of the dynamic predictive models describe herein using structured elements of the interaction data, the predicted outcome data, and the actual outcome data.

To facilitate a performance of these and other exemplary processes, such as those described herein, CA system 160 may maintain, within one or more tangible, non-transitory memories, a data repository 162 that includes, among other things, an interaction database 164 and a permissioning database 166. In some instances, interaction database 164 may include structured or unstructured data records characterizing interactions between one or more executable third-party applications, such as executed third-party application engine 112, and secure, programmatic interfaces established and maintained by computing systems operating within environment 100, such as an application programming interface (API) established and maintained by custodian system 130.

By way of example, and for a particular interaction between executed third-party application engine 112 and API of custodian system 130, the data records of interaction database 164 may include, but are not limited to: information identifying one or more requested elements of confidential user data; a digital token generated by custodian system 130 and indicative of a particular access permission granted to third-party application engine 112 (e.g., an OAuth token, as described herein); an application-specific access credential assigned to third-party application engine 112; an identifier of third-party system 110, such as an IP address; an identifier of the API, such as an IP address or other unique network address; and temporal data identifying a time or date of the request.

Further, in some instances, permissioning database 166 may include structured or unstructured data records characterizing one or more restrictions or limitations (or alternatively, no such restrictions or limitations) imposed by CA system 160 on an ability of third-party applications (e.g., as executed by client device 102) or third-party application engines (e.g., third-party application engine 112 executed by third-party system 110) to access elements of confidential data maintained by custodian system 130. By way of example, the one or more restrictions or limitations (or alternatively, the lack of restrictions or limitations) may be imposed by CA system 160 in response to an initial request for confidential data, e.g., as generated by executed third-party application engine 112, and may be subsequently modified by CA system 160 based on interactions between executed third-party application engine 112, and secure, programmatic interfaces established and maintained by computing systems operating within environment 100, such as an application programming interface (API) established and maintained by custodian system 130.

For example, each of the structured or unstructured data records of permissioning database 166 may include one or more elements of permissioning data, which characterize an initially imposed, or subsequently modified, restriction or limitation (or no such restriction) on the ability of a corresponding one of the third-party applications or third-party application engines (e.g., executed third-party application engine 112) to access elements of confidential data maintained by custodian system 130. In some instances, the structured or unstructured data records of permissioning database 166 may link the elements of permissioning data with corresponding application-specific access credentials, such as the application-specific credential assigned to third-party application engine 112 (e.g., as maintained within permissioning database 166 or within interaction database 164). Further, in some instances, the structured or unstructured data records of permissioning database 166 may establish a temporal evolution of the initially and subsequently imposed restrictions or limitations imposed on each of the third-party applications or third-party application engines, e.g., executed third-party application engine 112.

CA system 160 may also maintain, within the one or more tangible, non-transitory memories, one or more executable application programs 167, such as, but not limited to, a conversion engine 168, a predictive engine 170, and a dynamic consent engine 172. When executed by the one or more processors of CA system 160, conversion engine 168 can perform operations obtain elements of interaction data (e.g., from the data records of interaction database 164 or from one or more network-connected computing systems operating within environment 100, such as custodian system 130), and format all or selected portions of the obtained elements of interaction data into a structured input suitable for processing by one or more of the application programs described herein, such as, but not limited to, predictive engine 170.

In some instances, the structured input may include values of parameters extracted from the obtained elements of the interaction data, such as, but not limited to, an access credential assigned to third-party application engine 112, an identifier of a requested element of confidential data, or an identifier of an API or other programmatic interface, as described herein. In other instances, the structured input may include data derived from the interaction data. For example, executed conversion engine 168 may process the unique identifier of third-party system 110 (e.g., an IP address, etc.) to determine a physical location (e.g., latitude, longitude, altitude, etc.) of third-party system 110 and as such, of executed third-party application engine 112.

Further, in some examples, executed conversion engine 168 can further process the interaction data, either alone or in conjunction with additional or alternate data records of interaction database 164, to determine a daily, weekly, monthly, and/or yearly frequency at which an executed third-party application, e.g., executed third-party application engine 112, interacts with and requests data from a corresponding programmatic interface, e.g., the API established and maintained by custodian system 130. In some instances, after parsing and processing the obtained elements of the interaction data, conversion engine 168 can perform operations to store the resulting structured data within a corresponding portion of interaction database 164, e.g., for training and adaptively improving one or more of the exemplary predictive models described herein.

When executed by the one or more processors of CA system 160, predictive engine 170 may perform operations that apply one or more predictive models to portions of the exemplary structured input data described herein (e.g., generated by executed conversion engine 168 based on the obtained elements of interaction data. Based on the application of the one or more predictive models, executed predictive engine 170 may generate predicted outcome data indicative of a likelihood that an executed third-party application, such as executed third-party application engine 112, will manage one or more requested elements of confidential user data in accordance with an access granted by user 101 (e.g., as represented by a corresponding OAuth token) and with one or more terms or conditions enforced by a custodian or that data, e.g., custodian system 130.

For example, the predicted outcome data may indicate a likelihood, or a potential, that executed third-party application engine 112 or third-party system 110 will misuse the requested confidential data, such as but not limited to, by disclosing portions of the requested confidential data to additional parties not authorized by user 101 or custodian system 130, or by performing additional processing of the requested confidential data inconsistent with the access granted by user 101 or the terms or conditions imposed by custodian system 130. In other instances, the predicted outcome data may indicate a likelihood that all or a portion of the requested confidential data will be publicly disclosed, e.g., through an inadvertent breach by executed third-party system 110 or through an attack on third-party system 110 by one or more malicious parties.

In some instances, predictive engine 170 may generate the predicted outcome data based on an application of one or more deterministic or stochastic statistical processes, one or more machine learning processes, or one or more artificial intelligence models to portions of the exemplary structured input data described herein, e.g., as generated by executed conversion engine 168 based on elements of interaction data maintained within interaction database 164. Examples of the machine learning processes can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms). Further, examples of the stochastic statistical processes can include, but are not limited to, a supervised machine learning algorithm, such as a support vector machine (SVM) model, a multiple regression algorithm, a least absolute selection shrinkage operator (LASSO) regression algorithm, or a logistic regression algorithm, and examples of the deterministic statistical algorithms can include one or more linear regression models Further, the artificial intelligence models may include, but are not limited to, an artificial neural network model, a recurrent neural network model, a Bayesian network model, or a Markov model. By way of example, CA system 160 may include distributed computing components that represent corresponding input nodes of an initial layer of an artificial neural network model, and each of the nodes of the artificial neural network model may be configured to receive a corresponding element of the structured input data, as described herein. The artificial neural network model may also include one or more subsequent, layers of intermediate nodes (e.g., established by and corresponding to additional or alternate ones of the distributed computing components of CA system 160), which may be interconnected to the input nodes and further, which may be interconnected to an output node within a final output later of the artificial neural network model. In some instances, the output node (e.g. established by and corresponding to a further one of the distributed computing components of CA system 160) may be configured to generate the predicted output data indicative of the predictive likelihood of a misuse or breach by executed third-party application engine 112.

As described herein the predicted outcome data (e.g., the "decision" output from the final output layer) may correspond to a binary value, e.g., unity for misuse or breach, or zero for no misuse or no breach, or may correspond to a numerical range indicative of a likelihood of breach. Further, in some instances, these stochastic statistical processes, machine learning algorithms, or artificial intelligence models can be trained against, and adaptively improved using, training data having a specified structure and composition, which may be extracted from portions of interaction database 164 along with corresponding elements of predicted and actual outcome data, and can be deemed successfully trained and ready for deployment when a model accuracy (e.g., as established based on a comparison with the outcome data), exceeds a threshold value.

When executed by the one or more processors of CA system 160, dynamic consent engine 172 may perform operations that, based on the predicted outcome data, modify or revoke any prior permission granted to an application program executed by a third-party system (e.g., executed third-party application engine 112) to access confidential data maintained by custodian system 130 and in some instances, other custodian systems operating within environment 100. CA system 160 may, in some instances, generate data, e.g., permissioning data, that identifies the modification or revocation of the access permission and that includes temporal information that specifies and characterizes the permanent, or temporary, status of that modification or revocation.

As described herein, CA system 160 and one or more custodian systems within environment 100 that maintain confidential data on behalf of various users, such as custodian system 130, may participate in a distributed-ledger network. In some instances, CA system 160 may perform one or more consensus-based operations (e.g., established via consensus between CA system 160, custodian system 130, and the other custodian systems) that immutably record, within an additional ledger block of the distributed ledger, the permissioning data in conjunction with the access credential associated with executed third-party application engine 112. By way of example, the recorded permissioning data may correspond to a "flag" that, when accessed in conjunction with access credential, indicates the permanent or temporary revocation of an ability of executed third-party application engine 112, and as such, third-party system 110, to access confidential user data maintained by custodian system 130 and other custodian systems operating within environment 100.

In some instances, CA system 160 may perform operations that broadcast the newly updated distributed ledger, e.g., distributed ledger 180 that records the access credential and the permissioning data within the additional ledger block, to custodian system 130 and to each of the additional participants in the distributed-ledger network. By way of example, and as illustrated in FIG. 1, CA system 160 may store distributed ledger 180 within a corresponding portion of data repository 162, and custodian system 130 may receive and store distributed ledger 180 within a portion of data repository 132.

In other instances, the distributed-ledger network may include one or more peer systems 190, such as peer system 192, in communication with custodian system 130, CA system 160, and the other computing systems participating in the distributed-ledger networks. In some instances, CA system 160 may perform operations that broadcast the access credential and the generated permissioning data across network 120 to the one or more of peer systems 190, which may perform consensus-based operations that immutably record the access credential and the permissioning data within the additional ledger block, and that broadcast an updated distributed ledger to custodian system 130, CA system 160, and the other computing systems participating within the distributed-ledger environment.

Figure 2A:
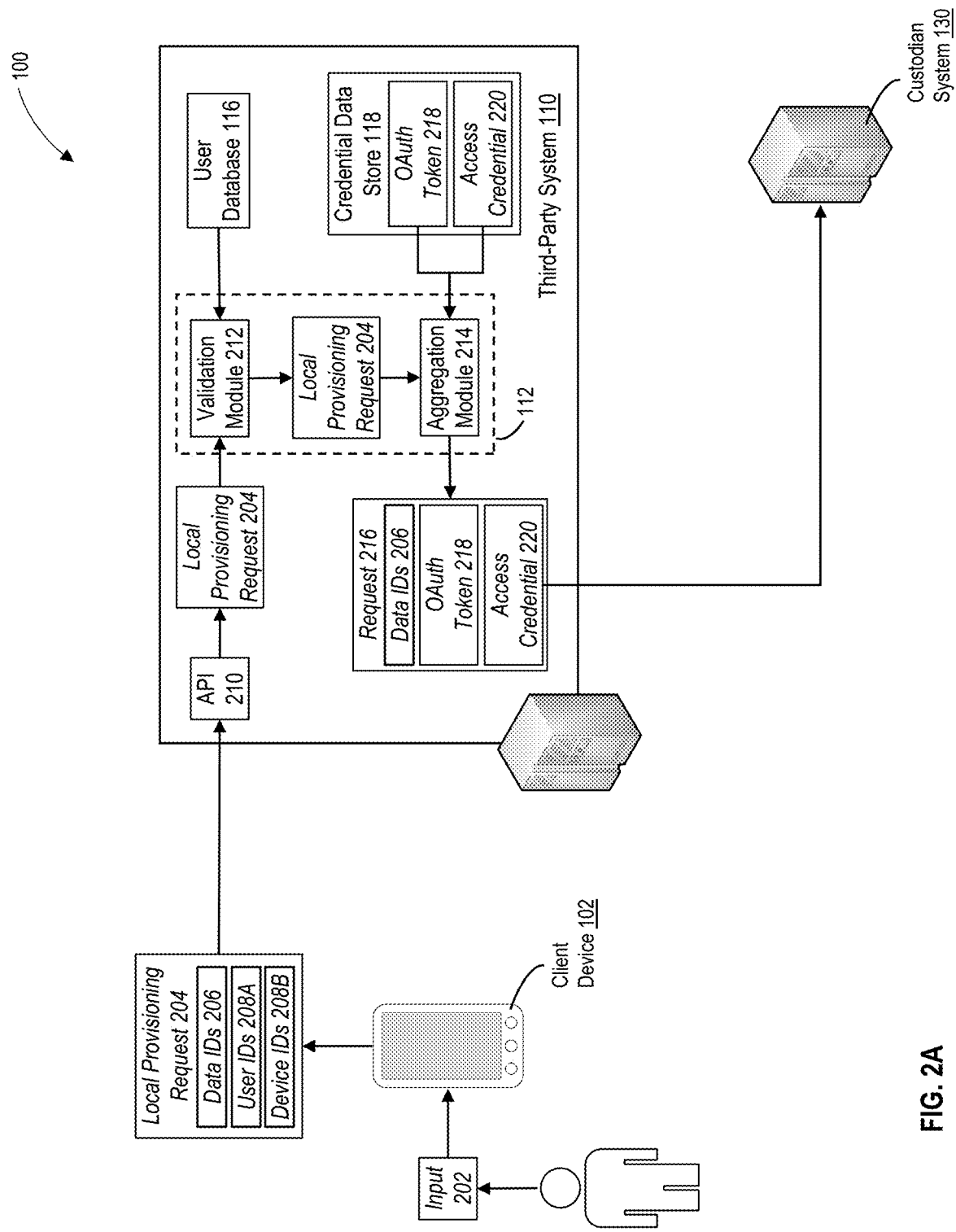
FIGS. 2A, 2B, 2C, and 2D are diagrams illustrating portions of an exemplary computing environment, in accordance with some embodiments.

II. Exemplary Computer-Implemented Processes for Dynamically Managing Consent, Permissioning, and Trust in an Open Banking Environment FIGS. 2A, 2B, 2C, and 2D illustrate portions of computing environment 100, in accordance with some exemplary embodiments. Referring to FIG. 2A, user 101 may provide, to an input unit of client device 102 (e.g., a pressure-sensitive touchscreen display unit), input 202 that requests an execution of one or more application programs, such as the mobile application provisioned to client device 102 by third-party system 110. Based on the receipt of input 202, the one or more processors of client device 102 may execute the provisioned mobile application, which may generate one or more elements of local provisioning request 204 and perform operations that cause client device 102 to transmit local provisioning request 204 across network 120 to third-party system 110, e.g., via a corresponding communications interface, such as a transceiver device (not illustrated in FIG. 2A).

In some instances, and as described herein, the executed mobile application may include a financial management application or a financial aggregator provisioned to client device 102 by third-party system 110, and the generated elements of local provisioning request 204 may include information that, when processed by one or more applications executed at third-party system 110, e.g., third-party application engine 112, cause third-party system 110 to request elements of confidential data maintained on behalf of user 101 by one or more custodian systems, e.g., as maintained within confidential data store 136 of custodian system 130.

By way of example, and without limitation, the requested elements of confidential data may include data characterizing a current account balance of a credit card account issued to held by user 101 (e.g., as maintained within confidential data store 136 of custodian system 130). In other examples, the requested elements of confidential data may characterize a balance of, or transactions, involving a deposit account, other credit card account, or an investment account of user 101 (e.g., as maintained within confidential data store 136 of custodian system 130), or elements of personal or demographic data characterizing user 101 (e.g., as maintained within user database 134 of custodian system 130).

As illustrated in FIG. 2A, local provisioning request 204 may include one or more of data identifiers 206, which uniquely identify each of the elements of confidential data requested by the executed mobile application. In some instances, data identifiers 206 may include a particular data type associated with each of the requested elements of confidential data (e.g., an account balance, transaction data, etc.) and one or more additional identifiers of the requested elements of confidential data, such as, but not limited to, a name of a deposit, credit card, or investment account or a tokenized account number. Further, local provisioning request 204 may also include user data 208A, which uniquely identifies user 101 (e.g., one or more authentication credentials assigned to user 101 by third-party system 110, etc.), and device data 208B, which uniquely identifies client device 102 (e.g., a network address, such as an IP address) or the executed mobile application (e.g., an application cryptogram, etc.).

A secure, programmatic interface established and maintained by third-party system 110, e.g. an application programming interface (API) 210, may receive and route local provisioning request 204 to third-party application engine 112, which when executed by the one or more processors of third-party system 110, may perform any of the exemplary processes described herein to validate local provisioning request 204 and to generate and transmit a request for elements of confidential data maintained on behalf of user 101 by one or more custodian systems, such as custodian system 130. For example, as illustrated in FIG. 2A, a validation module 212 of executed third-party application engine 112 may receive local provisioning request 204, access one or more of user data 208A or device data 208B, and validate one or more of user data 208A or device data 208B based on elements of user or device data maintained locally within the data records of user database 116.

If, for example, validation module 212 were unable to validate user data 208A or device data 208B, e.g., based on the locally maintained elements of user or device data, executed third-party application engine 112 may invalidate local provisioning request 204, and may generate and transmit an error message across network 120 to client device 102, e.g., via a secure, programmatic interface established and maintained by the executed mobile application. Alternatively, if validation module 212 were to validate each of user data 208A and device data 208B, executed third-party application engine 112 may validate local provisioning request 204 and route local provisioning request 204 to an aggregation module 214 of executed third-party application engine 112. In some instances, aggregation module 214 may perform operations that extract, from local provisioning request 204, all or a portion of data identifiers 206 and user data 208A, and based on the extracted portion of data identifiers 206, identify one or more custodian systems that maintain elements of confidential data consistent with the extracted portion of data identifiers 206.

By way of example, and as illustrated in FIG. 2A, aggregation module 214 may determine that data identifiers 206 include information specifying, among other things, the account balance for a credit card account held by user 101 (e.g., via a corresponding data type and an identifier of the credit card account), and that custodian system 130 maintains the requested account balance within a portion of confidential data store 136 (e.g., based on the identifier of the credit card account). Further, aggregation module 214 may perform operations that generate a request 216 for the elements of confidential data maintained by custodian system 130, e.g., the account balance of the credit card account maintained confidentially by custodian system 130.

In some instances, request 216 may include all or a portion of data identifiers 206, which identify the requested account balance of credit card account, and user data 208A, which uniquely identifies user 101. Further, as illustrated in FIG. 2A, aggregation module 214 may access credential data store 118, and obtain an OAuth token 218 associated with user 101 (e.g., based on user data 208A) and custodian system 130, and an access credential 220 associated with executed third-party application engine 112. As described herein, OAuth token 218 may confirm a prior authentication of an identity of user 101 by custodian system 130, and may be indicative of user 101's to the access by third-party application engine 112 of confidential data maintained at custodian system 130.

Further, and by way of example, access credential 220 may be associated with executed third-party application engine 112, and may be indicative of an initial determination by CA system 160 that third-party system 110 will manage one or more elements of confidential data (e.g., maintained by custodian system 130) in accordance with a level or type of consent granted by user 101 and further, in accordance with one or more access restrictions imposed on the accessed confidential data by custodian system 130. In some instances, these imposed access restrictions may be consistent with the level or type of consent granted by user 101, or alternatively, may be more restrictive that that previously provisioned consent, and examples of the access restrictions include, but are not limited to, a restriction on a use of confidential data by third-party system 110 or a restriction on an ability of third-party system 110 to distribute confidential data to other systems or devices.

Examples of access credential 220 include, but are not limited to, a digital token, cryptogram, hash value, or other element of cryptographic data that uniquely identifies executed third-party application engine 112 and/or third-party system 110, and CA system 160 may perform operations that generate and provision access credential 220 to third-party system 110 during an initial on-boarding or diligence process performed on behalf third-party system 110. For instances, and prior to accessing elements of confidential data maintained by custodian system 130 and other custodian systems operating within environment 100, CA system 160 may perform operations that determine whether third-party system 110, and an underlying third-party entity that operated third-party system 110, satisfy certain minimum criteria for stability and security.

In some instances, CA system 160 may perform operations that determine a status of the third-party entity before one or more regulatory, governmental, or legal entities, e.g., based on data exchanged through programmatic interfaces associated with these regulatory, governmental, or legal entities. Further, CA system 160 may also perform operations that establish that the determined status of the third-party entity comports with one or more threshold regulatory, legal, or governmental requirements. For example, CA system 160 may determine that the third-party entity is incorporated within a particular jurisdiction, that the third-party entity has resided in that jurisdiction for a threshold time period, that the third-party entity is not subject to any regulatory inquires or complaints during a threshold time period, and additionally, or alternatively, that the third-party entity is not a named defendant or respondent, or subject to any adverse judgments, during a threshold time period.

Based on a determination that the status of the third-party entity comports with one or more threshold requirements, CA system 160 may perform operations that generate access credential 220, and that associate access credential 220 with executed third-party application engine 112 and with third-party system 110. Further, CA system 160 may generate permissioning data indicative of any initial limitations or restrictions on an ability of third-party system 110 to access confidential data maintained by custodian system 130 and other custodian systems within environment 100. Ca system 160 may also perform any of the exemplary processes described herein to record access credential 220 and the permissioning data within a ledger block of a cryptographically secure distributed ledger, and to provision access credential 220 to third-party system 110.

Referring back to FIG. 2A, executed third-party application engine 112 may perform operations that cause third-party system 110 to transmit request 216, which includes data identifiers 206, OAuth token 218, and access credential 220, across network 120 to custodian system 130, e.g., using any appropriate communications protocol. In some instances, described below in reference to FIG. 2B, one or more application programs executed by custodian system 130, such data provisioning engine 140, may perform any of the exemplary processes described herein to verify, prior to provisioning the requested elements of confidential data to third-party system 110, that the access requested by third-party system 110 is consistent with a level or type of access previously granted to third-party system 110 by user 101 (e.g., based on OAuth token 218) and further, that third-party system 110 may be trusted to process, manage, or distribute the requested confidential data in accordance with the previously granted consent and with one or more terms or conditions imposed by custodian system 130 (e.g., based on access credential 220). Further, although not illustrated in FIG. 2A, executed third-party application engine 112 may perform any of the exemplary processes described herein to generate additional requests for elements of confidential information maintained by other custodian systems operating within environment 100, and to transmit these generated additional requests to corresponding ones of the other custodian systems.

Figure 2B:
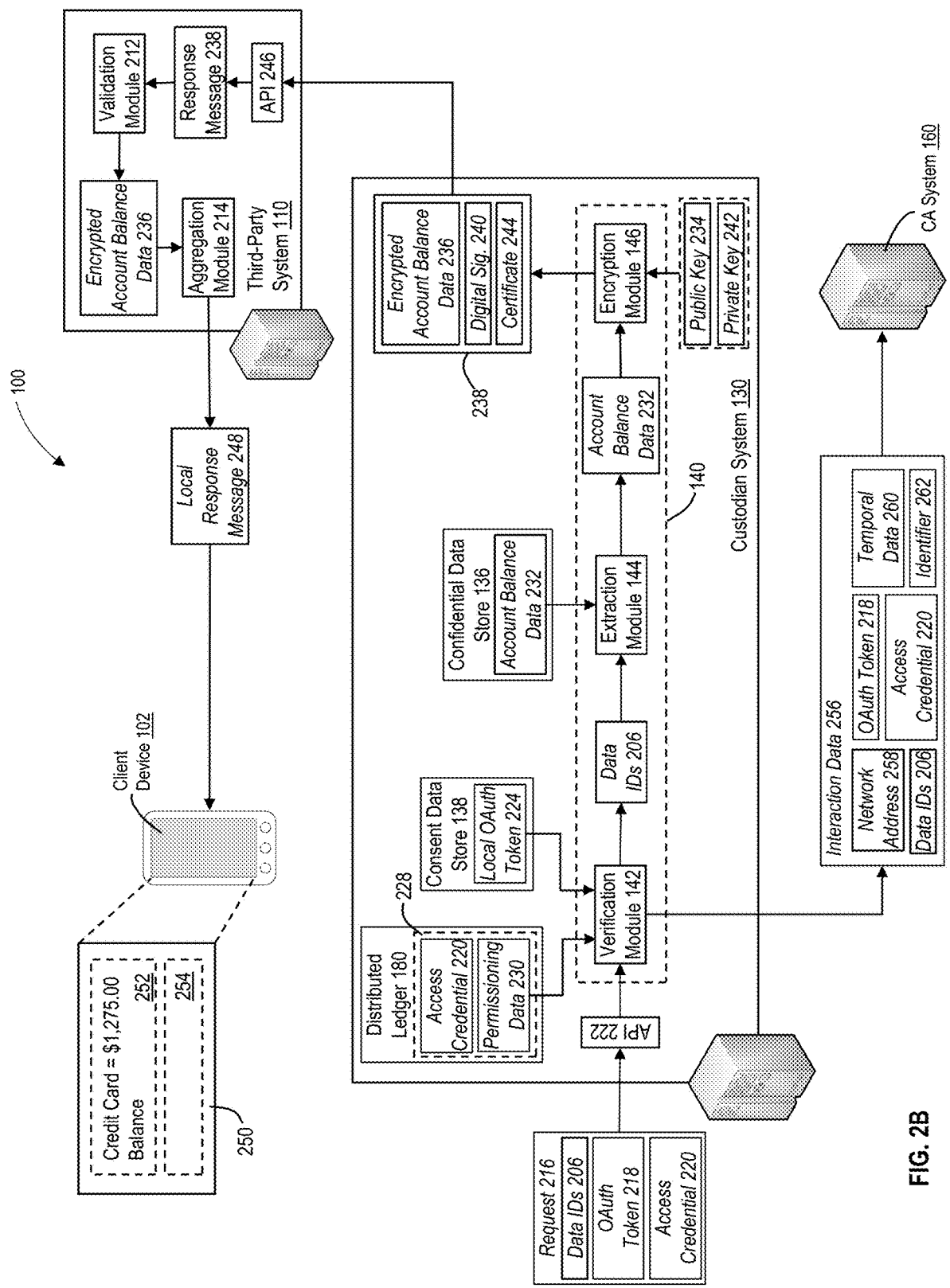

Referring to FIG. 2B, a secure, programmatic interface established and maintained by custodian system 130, e.g., application programming interface (API) 222, may receive request 216, and may parse request 216 and determine whether a structure or composition of OAuth token 218 is consistent with, or corresponds to, a predetermined token structure or composition (e.g., an "expected" token structure or composition). In some instances, (not illustrated in FIG. 2B), custodian system 130 may store data characterizing the expected token structure or composition within one or more tangible, non-transitory memories, e.g., within data repository 132.

If, for example, API 222 were to detect an inconsistency between the expected token structure or composition and the structure or composition of OAuth token 218, API 222 may decline to establish communications with executed third-party application engine 112, and custodian system 130 may generate and transmit an error message indicative of the detected inconsistency to third-party system 110, e.g., across communications network 120 using any appropriate communications protocol. In other instances, if API 222 were to establish a consistency between the expected token structure or composition and the structure or composition of OAuth token 218, API 222 may establish that third-party application engine 112 is permitted to access data provisioning engine 140, and may establish secure, programmatic communications between third-party application engine 112 (e.g., as executed by third-party system 110) and data provisioning engine 140 (e.g., as executed by custodian system 130).

Responsive to the established permission, API 222 may route request 216 to a verification module 142 of executed data provisioning engine 140, which may perform operations that validate OAuth token 218. By way of example, when executed by data provisioning engine 140 (e.g., based one or more commands programmatically generated by executed data provisioning engine 140), verification module 142 may perform operations that compare OAuth token 218 against a local OAuth token 224 maintained within the one or more tangible, non-transitory memories, e.g., within consent data store 138 of data repository 132. In some instance, local OAuth token 224 may be associated with, or linked to, a unique identifier of user 101, client device 102, third-party system 110, and/or third-party application engine 112, which may be linked to, or associated with, local OAuth token 224 within consent data store 138.

If verification module 142 were to detect an inconsistency between OAuth token 218 and local OAuth token 224, verification module 142 may decline to verify OAuth token 218 and may decline to provision the requested confidential data to third-party system 110. Responsive to the detected inconsistency, executed data provisioning engine 140 may generate and transmit an error message indicative of the failed verification process to third-party system 110 (not illustrated in FIG. 2B). Alternatively, if verification module 142 were to establish a consistency between OAuth token 218 and local OAuth token 224 (e.g., that OAuth token 218 corresponds to and matches local OAuth token 224), verification module 142 may perform additional operations that determine whether executed third-party application engine 112 and/or third-party system 110 should be trusted to manage the requested confidential data in accordance with the user-specified consent (e.g., based on OAuth token 218) and/or terms and conditions imposed by custodian system 130.

For example, executed verification module 142 may obtain access credential 220 from request 216, and may further access distributed ledger 180, maintained within data repository 132. Executed verification module 142 may parse the ledger blocks of distributed ledger 180 to determine whether one or more of the ledger blocks immutably records access credential 220, e.g., as associated with executed third-party application engine 112. In one instance, if executed verification module 142 were unable to identify access credential 220 within any of the ledger blocks of distributed ledger 180, executed verification module 142 may determine that executed third-party application engine 112 and/or third-party system 110 should not be trusted to manage the requested confidential data (e.g., that CA system 160 has not assessed third-party application engine 112 and/or third-party system using any of the exemplary processes described herein), and may decline to provision the requested confidential data to third-party system 110. Executed data provisioning engine 140 may generate and transmit an error message indicative of the failed verification process to third-party system 110 (not illustrated in FIG. 2B).

Alternatively, if executed verification module 142 were to identify access credential 220 within one or more of the ledger blocks of distributed ledger 180, executed verification module 142 may access a latest and most temporally recent one of the ledger blocks, e.g., ledger block 228 of FIG. 2B. As described herein, the recordation of access credential 220 onto the ledger blocks of distributed ledger 180 and may be indicative of an initial determination by CA system 160 that executed third-party application engine 112 and/or third-party system 110 will manage the requested elements of confidential data (e.g., maintained by custodian system 130) in accordance with the user-specified consent and/or terms and conditions imposed by custodian system 130. In some instances, executed verification module 142 may also parse ledger block 228 to obtain permissioning data 230 that identifies one or more restrictions or limitations (or alternatively, no such limitations) on an ability of executed third-party application engine 112 to access the requested confidential data maintained by custodian system 130 (e.g., as imposed initially, or subsequently modified by, CA system 160 using any of the exemplary processes described herein).

The disclosed embodiments are, however, not limited processes that identify and access permissioning data 230 recorded within a latest and most temporally recent ledger block of distributed ledger 180. In other examples, not illustrated in FIG. 2B, executed verification module 142 may perform operations that access one or more data records of a database or data repository maintained at custodian system 130, e.g., one or more data records of consent data store 138, and parse the accessed data records to identify access credential 220 and extract permissioning data 230, which identifies the one or more restrictions or limitations (or alternatively, no such limitations) on the ability of executed third-party application engine 112 to access the requested confidential data maintained by custodian system 130. Permissioning data 230 may be generated by, or subsequently modified by, CA system 160 using any of the exemplary processes described herein, and CA system 160 may perform operations that that transmit permissioning data 230 to custodian system 130 across network 120, e.g., via a corresponding programmatic interface.

In some instances, executed verification module 142 may determine that permissioning data 230 identifies no restrictions or limitations on the ability of executed third-party application engine 112. Executed verification module 142 may perform operations that route all or a portion (e.g., data identifiers 206) of request 216 to an extraction module 144 of executed data provisioning engine 140.

In other instances, permissioning data 230 may identify one or more restrictions or limitations imposed on executed third-party application engine 112 by CA system 160. For example, permissioning data 230 may revoke a permission of executed third-party application engine 112 to access any elements of confidential data maintained by custodian system 130 and/or other custodian systems operation within environment 100, e.g., on a permanent basis or for a specified time period. Additionally, or alternatively, permissioning data 230 may limit an ability of executed third-party application engine 112 to access specific elements or confidential data, or specific classes of confidential data, on a permanent basis or for a specified time period.

For example, permissioning data 230 may revoke a permission of executed third-party application engine 112 to access any confidential data that includes a government-issued identifier of user 101 (e.g., a social security number or a driver's license number) or an actual or tokenized account number of user 101 on a permanent basis, but may continue to permit executed third-party application engine 112 to access aggregated financial data associated with one or more accounts held by user 101 (e.g., the requested account balance of the credit card account held by user 101). The disclosed embodiments are, however, not limited to these examples of imposed restrictions or limitations, and in other instances, the recorded elements of permissioning data 230 may include additional or alternate restrictions on the ability of executed third-party application engine 112 to access specific elements or specific classes confidential data on a permanent or temporary basis.

Based on the detection of permissioning data 230 within ledger block 228, executed verification module 142 may perform operations that determine whether the access to confidential data requested by third-party application engine 112 (e.g., within request 216) is consistent with the imposed limitations or restrictions identified within permissioning data 230. For example, and as described herein, executed third-party application engine 112 may request access to confidential data specifying an account balance of a credit card account issued to user 101, e.g., as maintained by custodian system 130. In some instances, if the recorded elements of permissioning data 230 revoked the ability of third-party application engine 112 to access the account balance of the credit card account on a permanent basis, or if the recorded elements of permissioning data 230 revoked the ability of third-party application engine 112 to access the account balance of a credit card account during a particular time period and custodian system 130 received request 216 during that particular time period, executed verification module 142 may determine that the requested access is inconsistent with the imposed limitations or restrictions.

Executed data provisioning engine 140 may then decline to provision the requested elements of confidential data to executed third-party application engine 112, and may generate and transmit an error message indicative of the failed verification process to third-party system 110 (not illustrated in FIG. 2B).

Alternatively, if executed verification module 142 were to establish an inapplicability of each of the imposed limitations or restrictions to the requested elements of confidential data (e.g., that the imposed limitations or restrictions do not apply to the requested account balance), or if custodian system 130 received request 216 subsequent to a particular time period associated with the revoked access, executed verification module 142 may determine that the requested access is consistent with the imposed limitations or restrictions. Executed verification module 142 may perform operations that route all or a portion (e.g., data identifiers 206) of request 216 to an extraction module 144 of executed data provisioning engine 140.

Referring back to FIG. 2B, and when executed by the one or more processors of custodian system 130 (e.g., based on commands programmatically generated by executed data provisioning engine 140), extraction module 144 may access confidential data store 136, and identify and extract one or more elements of confidential data consisted with data identifiers 206. For example, and as described herein, data identifiers 206 may identify and characterize the requested account balance of the credit card account held by user 101, and executed extraction module 144 may perform operations that extract account balance data 232 from confidential data store 136 and that provide account balance data 232 as an input to encryption module 146 of executed data provisioning engine 140.

In additional examples, not illustrated in FIG. 2B, executed extraction module 144 may also provide, as an input to encryption module 146, additional information identifying and characterizing one or more terms or conditions imposed by custodian system 130 on account balance data 232. By way of example, and without limitation, the additional information may specify a storage or maintenance protocol for account balance data 232 at third-party system 110 (e.g., that third-party system 110 store the account balance data 232 in encrypted format, that third-party system 110 discard the stored elements of account balance data 232 after a specified time period, etc.) and additionally, or alternatively a distribution protocol associated with the provisioned elements of account balance data 232 (e.g., that third-party system 110 may only distribute encrypted elements of account balance data 232 to client device 102 or other devices operated by user 101, etc.).

When executed by the one or more processors of custodian system 130 (e.g., based on commands programmatically generated by executed data provisioning engine 140), encryption module 146 may perform operations that encrypt account balance data 232, which identifies the requested account balance of the credit card account of user 101, using a public cryptographic key 234 of executed third-party application engine 112. Further, in some instances, executed encryption module 146 may also perform operations that encrypt the information identifying the imposed terms or conditions (as described herein) using public cryptographic key 234, either alone or in conjunction with account balance data 232.

As illustrated in FIG. 2B, executed encryption module 146 may perform operations that package encrypted account balance data 236 into a corresponding portion of a response message 238, wither along or in conjunction with the encrypted information characterizing the imposed terms and conditions. Further, executed encryption module 146 may also perform operations that apply a digital signature 240 to encrypted account balance data 236 (and in some instances, to the encrypted information characterizing the imposed terms and conditions), e.g., using any appropriate digital signature algorithm in conjunction with a private cryptographic key 242 of custodian system 130. Executed encryption module 146 may also package digital signature 240 and a public key certificate 244 of custodian system 130 (e.g., that includes a corresponding public cryptographic key) into corresponding portions of response message 238. In some instances, executed data provisioning engine 140 may perform operations that cause custodian system 130 to transmit response message 238 across network 120 to third-party system 110 using any appropriate communications protocol, e.g., via the corresponding communications interface, such as the transceiver device.

A secure, programmatic interface established and maintained by executed third-party application engine 112, e.g., application programming interface (API) 246, may receive response message 238, and may route response message 238 to validation module 212. In some instances, validation module 212 may parse response message 238 to extract digital signature 240 and public key certificate 244, and may perform operations that validate digital signature 240 based on the public cryptographic key of custodian system 130 included within public key certificate 244. Responsive to the validation of digital signature 240, validation module 212 may provide encrypted account balance data 236 (and in some instances, encrypted information characterizing the imposed terms and conditions) as an input to data aggregation module 214 of executed third-party application engine 112. Further, although not illustrated in FIG. 2B, API 246 may receive additional response messages, which include encrypted and digitally signed elements of confidential data requested from other custodian devices operating within environment 100, and validation module 212 may perform any of the exemplary processes described herein to validate the digital signature included within each of the additional response messages, and response to a successful validation of these digital signature, provide the encrypted elements of confidential data as further inputs to aggregation module 214.

In some instances, aggregation module 214 may perform operations that decrypt each of the encrypted elements of confidential data, including encrypted account balance data 236 (and in some instances, encrypted information characterizing the imposed terms and conditions), using a private cryptographic key of executed third-party application engine 112. Aggregation module 214 may perform operations that store the now-decrypted elements of confidential data, including the decrypted account balance data, within one or more locally accessible or cloud-based data repositories, e.g. in accordance with corresponding ones of terms and conditions imposed by custodian system 130 and the other custodian systems operating within environment 100.

Further, aggregation module 214 may also perform operations that re-encrypt each of the decrypted elements of confidential data, including the decrypted account balance of the credit card account issued to user 101, using a public cryptographic key of client device 102 or the executed mobile application, and package the re-encrypted elements of confidential data into corresponding portions of a portion of a local response message 248. In some instances, aggregation module 214 may also apply a digital signature to the re-encrypted elements of confidential data, including the re-encrypted account balance of the credit card account issued to user 101, and package the applied digital signature and a public key certificate of executed third-party application engine 112 into local response message 248. As illustrated in FIG. 2B, executed third-party application engine 112 may perform operations that cause third-party system 110 to transmit local response message 248 across network 120 to client device 102 using any appropriate communications protocol, e.g., via the corresponding communications interface, such as the transceiver device.

In some instances, not illustrated in FIG. 2B, a secure, programmatic interface established and maintained by the executed mobile application may receive local response message 248, and may route local response message 248 to the executed mobile application. Further, although not illustrated in FIG. 2B, the executed mobile application may perform operations that validate the digital signature applied to the re-encrypted elements of confidential data within local response message 248 (e.g., using the public cryptographic key included within the public key certificate of executed third-party application engine 112), that decrypt the each of the re-encrypted elements of confidential data (e.g., using a private cryptographic key of the executed mobile application), and the render the newly decrypted elements of confidential data, including the newly decrypted account balance of the credit card account issued to user 101, for presentation within a digital interface 250, e.g., via the corresponding display unit. By way of example, digital interface 250 may include interface elements 252, which identify the account balance of the credit card account issued to user 101 (e.g., "Credit Card Balance=$1,275.00"), and additional interface elements 254 that provide a graphical or textual representation of each of the additional elements of confidential data.

Further, and as illustrated in FIG. 2B, verification module 142 of executed data provisioning engine 140 may also perform operations that generate interaction data 256 characterizing the interaction between executed third-party application engine 112 and API 222 of custodian system 130, e.g., through request 216 for the confidential data identifying the account balance of the credit card issued to user 101, as maintained by custodian system 130. For example, interaction data 256 may include, among other things: a network address 258 associated with third-party system 110, such as an assigned IP address; data identifiers 206, which identify and characterized the requested elements of confidential data maintained by custodian system 130, e.g., the requested account balance of the credit card account issued by user 101; and OAuth token 218 and access credential 220, as extracted from request 216. The generated elements of interaction data 256 may also include temporal data 260, which identifies a time or date at which API 222 received request 216, and further, a unique identifier 262 of API 222 that includes, but is not limited to, an IP address or other unique network address assigned to API 222.

In some instances, executed data provisioning engine 140 may perform operations that cause custodian system 130 to transmit interaction data 256 across network 120 to CA system 160 using any appropriate communications protocol. CA system 160 may receive interaction data 256, which characterizes the interaction between executed third-party application engine 112 and API 222 of custodian system 130, and may perform any of the exemplary processes described herein to generate elements of structured input data based on portions of interaction data 256, to apply one or more adaptive predictive models to the elements of structured input data, and based on the application of the one or more adaptive predictive models to the elements of structured input data, generate predicted outcome data indicative of a likelihood that executed third-party application engine 112 (and/or third-party system 110) will manage the confidential data specified within request 216 in accordance with the level or type of access granted by user 101 and with one or more terms or conditions imposed by custodian system 130.

Further, and based on the predicted outcome data, CA system 160 may perform additional ones of the exemplary processes described herein to impose a restriction or a limitation on an ability of executed third-party application engine 112 (and/or third-party system 110) to access elements of confidential data maintained by custodian system 130 and the other custodian systems 130. In some instances, CA system 160 may generate one or more elements of permissioning data indicative of newly imposed restriction or limitation, and may perform operations that record the one or more generated elements of permissioning data in one or more additional ledger blocks of distributed ledger 180 in conjunction with access credential 220 of executed third-party application engine 112, and that broadcast an updated version of distributed ledger 180, which includes the one or more additional ledger blocks, to each computing system participating in the distributed-ledger network described herein, including custodian system 130.

Figure 2C:
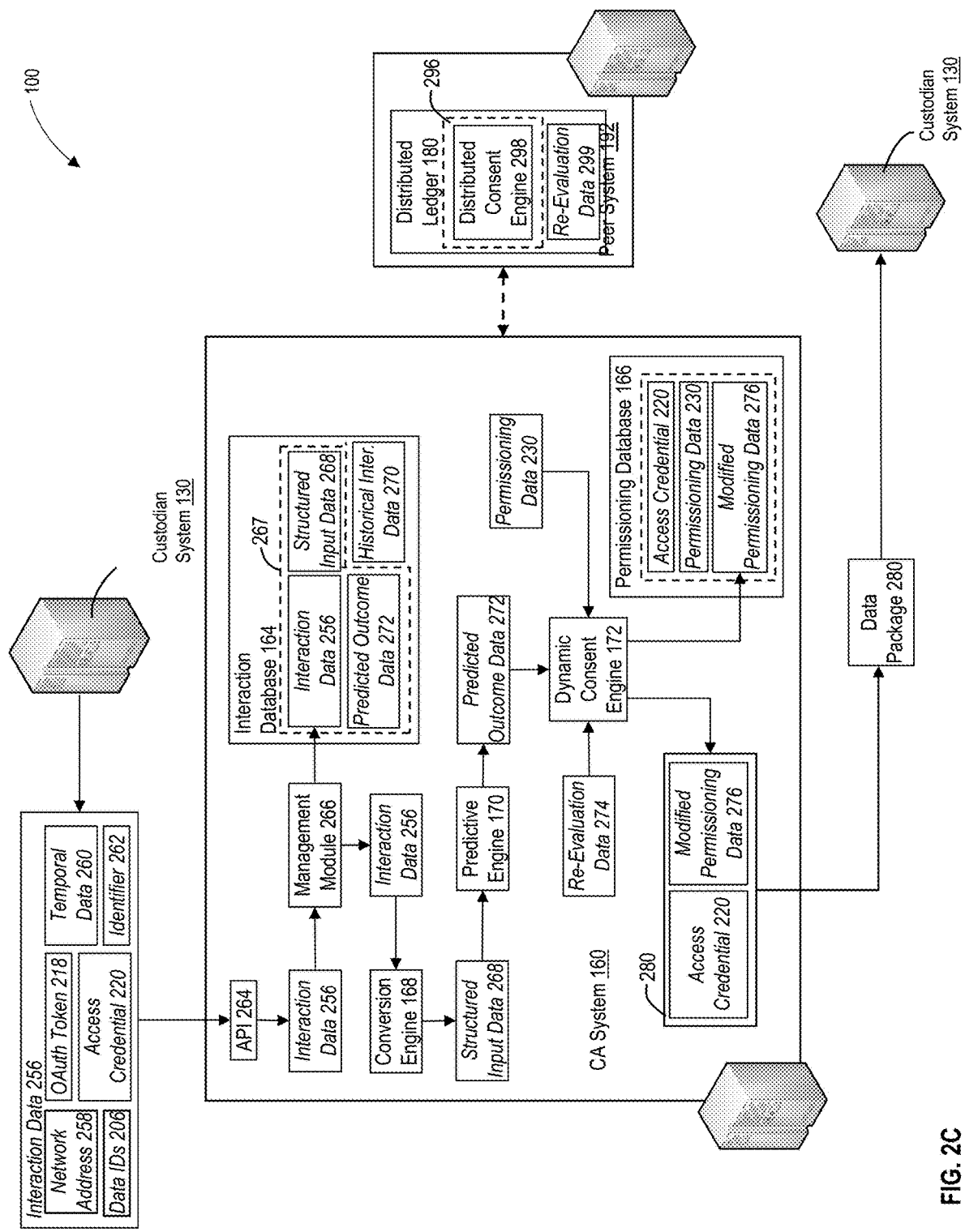

Referring to FIG. 2C, a secure, programmatic interface established and maintained by CA system 160, such as application programming interface (API) 264 may receive interaction data 256 and may route interaction data 256 to a management module 266 executed by the one or more processors of CA system 160. In some instances, executed management module 266 may perform operations that store received interaction data 256 within one or more data records 267 of interaction database 164, and that provide received interaction data 256 as an input to conversion engine 168. When executed by the one or more processors of CA system 160, conversion engine 168 may perform operations that process portions of received interaction data 256 to generate structured input data 268, which may be provisioned to predictive engine 170.

In some examples, structured input data 268 may include values of parameters extracted from elements of interaction data 256, and examples of these parameter values include, but are not limited to, access credential 220 (e.g., as associated with executed third-party application engine 112), data identifiers 206 (e.g., that identify the requested account balance of the credit card account issued to user 101), all or a portion of temporal data 260 (e.g., that identifies the time or date at which API 222 received request 216), and identifier 262 of API 222 maintained by custodian system 130 (e.g., the IP address assigned to API 222). In other instances, structured input data 268 may also include additional values of parameters derived from one or more elements of interaction data 256 and additionally, or alternatively, derived from the one or more elements of interaction data 256.

For example, executed conversion engine 168 may parse interaction data 256 to obtain network address 258 of third-party system 110, e.g., the IP address assigned to third-party system 110, and may perform operations that process the IP address to determine a geographic location associated with third-party system 110. The determined geographic location may include a city, state, and/or country associated with the IP address and additionally, or alternatively, one or more geospatial coordinates that identify the geographic location, such as a longitude, a latitude, and/or an altitude. In some instances, executed conversion engine 168 may package geographic data that specified the determined geographic location (e.g., the determined city, state, and/or country, the determined geospatial coordinates, etc.) into a corresponding portion of structured input data 268.

Executed conversion engine 168 may also access the data records of interaction database 164, and obtain historical interaction data 270 that characterize one or more prior interactions between executed third-party application engine 112 and API 222 of custodian system 130. In some instances, historical interaction data 270 may also include or reference access credential 220, network address 258 of third-party system 110, and identifier 262 of API 222, and executed conversion engine 168 may perform any of the exemplary processes described herein to generate one or more aggregate, composite, or statistical values that characterize the prior executed third-party application engine 112 and API 222 of custodian system 130 over one or more prior temporal intervals.

By way of example, and based on temporal data included within interaction data 256 and within each of the one or more elements of historical interaction data 270, executed conversion engine 168 may compute a frequency at which third-party application engine 112 accesses API 222 on a daily, weekly, monthly, and/or yearly basis, or during any additional or alternate temporal interval consistent with historical interaction data 270, and may package the computed access frequencies within corresponding portions of structured input data 268. In some instances, executed conversion engine 168 can perform operations to store the structured input data 268 within a corresponding portion of interaction database 164, e.g., for training and adaptively improving one or more of the exemplary predictive models described herein. As illustrated in FIG. 2C, executed conversion engine 168 may provide structured input data 268 as an input to predictive engine 170, which upon execution by the one or more processors of CA system 160, may apply one or more of the exemplary predictive models described here to each element of structured input data 268. Based on the application of these one or more exemplary predictive models, executed predictive engine 170 may generate predicted outcome data 272 indicative of a likelihood that executed third-party application engine 112 (and/or third-party system 110) will manage the confidential data specified within request 216 (e.g., the requested account balance of the credit card account issued to user 101) in accordance with the level or type of access granted by user 101 and with the one or more terms or conditions imposed by custodian system 130.

As described herein, the one or more predictive models applied by executed predictive engine 170 may include, but are not limited to, a deterministic statistical process, a stochastic statistical process, a machine learning process, or an artificial intelligence model. For example, the deterministic statistical processes can include, but are not limited to, an index based on certain parameter values, a linear regression model, a nonlinear regression model, a multivariable regression model, and additionally, or alternatively, a linear or nonlinear least-squares approximation. Examples of the stochastic statistical process can include, among other things, a support vector machine (SVM) model, a multiple regression algorithm, a least absolute selection shrinkage operator (LASSO) regression algorithm, or a multinomial logistic regression algorithm, and examples of the machine learning processes can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms).

Further, the artificial intelligence models may include, but are not limited to, an artificial neural network model, a recurrent neural network model, a Bayesian network model, or a Markov model. By way of example, and as described herein, CA system 160 may include distributed computing components that represent corresponding input nodes of an initial layer of an artificial neural network model, and each of the nodes of the artificial neural network model may be configured to receive a corresponding element of structured input data 268, as described herein. The artificial neural network model may also include one or more subsequent, layers of intermediate nodes (e.g., established by and corresponding to additional or alternate ones of the distributed computing components of CA system 160), which may be interconnected to the input nodes and further, which may be interconnected to an output node within a final output later of the artificial neural network model. In some instances, the output node (e.g. established by and corresponding to a further one of the distributed computing components of CA system 160) may be configured to generate predicted outcome data 272.

By way of example, and consistent with the disclosed embodiments, environment 100 may include one or more third-party systems, such as third-party system 110, which may collectively execute any number N of third-party applications, such as third-party application engine 112 executed by third-party system 110. To characterize the interaction between each of these N third-party applications and corresponding secure, programmatic interfaces established or maintained by corresponding custodian systems within environment 100 (e.g. API 222 established and maintained by custodian system 130), structured input data 268 may be characterized by the following exemplary structure:

$$\{[TP_1, \ldots, TP_N],[D_1, \ldots, D_N],[L_1, \ldots, L_N],\\ [API_1, \ldots, API_N],[t_1, \ldots, t_N],[F_1, \ldots, F_N]\}.$$

In some instances, $[TP_1, \ldots, TP_N]$ corresponds to an array of identifiers of applications executed by each of the N third-party systems operating within environment 100, $[D_1, \ldots, D_N]$ corresponds to an array of data identifiers that identify and characterize the elements of confidential data requested by each of the applications executed by the N third-party systems, and $[L_1, \ldots, L_N]$ corresponds to an array of geographic locations associated with corresponding ones of the applications executed by the N third-party systems (e.g., as determined by executed conversion engine 168 based on an IP address of each executed application, as described herein).

Further, $[API_1, \ldots, API_N]$ corresponds to an array of unique identifiers of a secure programmatic interface (e.g., an IP address of a corresponding API) accessed by each of the applications executed by the N third-party systems, and $[t_1, \ldots, t_N]$ corresponds to an array of times or dates at which each of the application programs executed by the N third-party systems accessed corresponding ones of the programmatic interfaces identified by $[API_1, \ldots, API_N]$. In some instances, $[F_1, \ldots, F_N]$ may correspond to a multi-dimensional array characterizing a frequency at which each of the applications executed by the N third-party systems accessed corresponding ones of the programmatic interfaces identified by $[API_1, \ldots, API_N]$ over one or more prior temporal intervals. For instance, and for one of the executed applications $TP_i$ executed by an $i^{th}$ one of the third-party systems, the corresponding element of the multidimensional frequency array may be defined as:

$$F_i = (f_{i,D}, f_{i,W}, f_{i,M}, f_{i,Y}),$$

where $f_{i,D}$, $f_{i,W}$, $f_{i,M}$ and $f_{i,Y}$ represent frequencies at which executed applications $TP_i$ accesses $API_i$ on respective ones of a daily, weekly, monthly, and yearly basis.

By way of example, and based on received interaction data 256 and on the one or more accessed elements of historical interaction data 270, executed conversion engine 168 may perform any of the exemplary processes described herein to generate structured input data having the following format:

$$\{[TP_1, 0, \ldots, 0], [D_1, 0, \ldots, 0], [L_1, 0, \ldots, 0], \\ [API_1, 0, \ldots, 0], [t_1, 0, \ldots, 0], [F_1, 0, \ldots, 0]\},$$

where: $TP_1$ corresponds to network address 258 associated with executed third-party application engine 112, such as the IP address of third-party system 110; $D_1$ corresponds to all or a portion of data identifiers 206, which identify and characterize the requested account balance of the credit card account held by user 101; $L_1$ corresponds to geographic location associated with executed third-party application engine 112; $API_1$ corresponds to identifier 262 of API 222; and $t_1$ corresponds to temporal data 260. Further, and as described herein, $F_1$ represents an array $(f_{1,D}, f_{1,W}, f_{1,M}, f_{1,Y})$ of daily, weekly, monthly, and yearly frequencies at which executed third-party application engine 112 access API 222, e.g., as determined by executed conversion engine 168.

Referring back to FIG. 2C, and based on the application of the exemplary predictive models to structured input data 268, executed predictive engine 170 may generate predicted outcome data 272 indicative of a likelihood that executed third-party application engine 112 (and/or third-party system 110) will manage the confidential data specified within request 216 (e.g., the requested account balance of the credit card account issued to user 101) in accordance with the level or type of access granted by user 101 and with the one or more terms or conditions imposed by custodian system 130. In some instances, predicted outcome data 272 (e.g., the "decision" output from the final output layer of the exemplary neural network model described herein) may correspond to a binary value, e.g., unity for misuse or breach, or zero for no misuse or no breach, or may correspond to a numerical range indicative of a likelihood of misuse or breach.

In some instances, executed predictive engine 170 may perform operations that store structured input data 268 and predicted outcome data 272 within data records 267 of interaction database 164, e.g., in conjunction or association with interaction data 256. Executed predictive engine 170 may further provide predicted outcome data 272 an input to dynamic consent engine 172, which when executed by the one or more processors of CA system 160, may perform any of the exemplary processes described herein to modify dynamically a prior determination (e.g., by CA system 160) that executed third-party application engine 112 will manage the requested elements of confidential data) in accordance with a level or type of consent granted by user 101 and further, in accordance with one or more terms or conditions by custodian system 130.

For example, as illustrated in FIG. 2C, executed dynamic consent engine 172 may receive predicted outcome data 272, and may perform operations that obtain re-evaluation data 274, which specifies predetermined criteria that trigger a re-evaluation of an ability or permission of executed third-party application engine 112 to access not only the requested element of confidential data maintained by custodian system 130 (e.g., the requested account balance of the credit card account issued to user 101), but also elements of confidential data maintained by other custodian systems operating within environment 100. In one instance (not illustrated in FIG. 2C), executed dynamic consent engine 172 may extract re-evaluation data 274 from the one or more non-tangible memories of CA system 160. In other instances, executed dynamic consent engine 172 may access one or more ledger blocks of distributed ledger 180 (e.g., as maintained within the one or more tangible, non-transitory memories), and extract re-evaluation data 274 from the one or more accessed ledger blocks.

Further, executed dynamic consent engine 172 may also obtain permissioning data 230, which identifies one or more restrictions or limitations currently imposed by CA system 160 on the ability of third-party application engine 112 and/or third-party system 110 to access confidential data maintained by custodian system 130 and other custodian systems within environment 100. By way of example, executed dynamic consent engine 172 may access a locally accessible or cloud-based data repository or database, such as permissioning database 166, identify one or more data records that include or are associated with access credential 220, and extract permissioning data 230 from the one or more identified data records. In other examples, executed dynamic consent engine 172 may also access ledger block 228 of distributed ledger 180, which includes access credential 220 associated with executed third-party party application engine 112, and extract permissioning data 230 from ledger block 228.

In some instances, re-evaluation data 274 may include one or more threshold values that when exceeded by predicted outcome data 272, cause executed dynamic consent engine 172 to perform operations that revoke or modify, on a temporary or permanent basis, the ability of third-party application engine 112 to access confidential data maintained by custodian system 130 and other custodian systems within environment 100. For example, and as described herein, predicted outcome data 272 may include a binary value indicative of a likely misuse or breach of the requested elements of confidential data, e.g., a value of unity. Based on portions of re-evaluation data 274 (e.g., the one or more threshold values and predetermined criteria described herein), executed dynamic consent engine 172 may determine to revoke the ability of third-party application engine 112 to access confidential data maintained by custodian system 130 and other custodian systems within environment 100, either on a permanent basis (e.g., if elements of permissioning data 230 identify one or more previously imposed restrictions) or for a predetermined time period (e.g., if permissioning data 230 identifies no previously imposed restrictions). As illustrated in FIG. 2C, executed dynamic consent engine 172 may generate one or more elements of modified permissioning data 276 indicative of the permanent or temporary revocation.

In other instances, predicted outcome data 272 may include an additional binary value indicative of a minimal likelihood of misuse or breach of the requested elements of confidential data, e.g., a value of zero. Based on portions of re-evaluation data 274 (e.g., the one or more threshold values and predetermined criteria described herein), executed dynamic consent engine 172 may elect to maintain an existing ability of executed third-party application engine 112 to access confidential data maintained by custodian system 130 and other custodian systems within environment 100. Additionally, or alternatively, when the binary value indicates the minimal likelihood of misuse or breach, executed dynamic consent engine 172 may determine to remove one or more previously imposed restrictions or limitations on the ability of executed third-party application engine 112 to access confidential data (e.g., as specified within the elements of permissioning data 230 recorded within ledger block 228). As illustrated in FIG. 2C, executed dynamic consent engine 172 may generate one or more additional elements of modified permissioning data 276 indicative of the maintained access or the removed restrictions or limitations.

In other examples, predicted outcome data 272 may include a non-binary value indicative of a likelihood that executed third-party application engine 112 will misuse the requested elements of confidential data, e.g., ranging from a value of zero (minimal likelihood) to a value of unity (likely misuse or breach). Based on portions of re-evaluation data 274 (e.g., the one or more threshold values and predetermined criteria described herein), executed dynamic consent engine 172 may establish that the decimal of fractional value exceeds one of the threshold values, and may determine to revoke the ability of third-party application engine 112 to access confidential data maintained by custodian system 130 and other custodian systems within environment 100, either on a permanent basis (e.g., if elements of permissioning data 230 recorded within ledger block 228 identify one or more previously imposed restrictions) or for a predetermined time period (e.g., if ledger block 228 identifies no previously imposed restrictions). Executed dynamic consent engine 172 may generate one or more elements of modified permissioning data 276 indicative of the permanent or temporary revocation.

Alternatively, if executed dynamic consent engine 172 were to establish that the value fails to exceed any of the threshold values, executed dynamic consent engine 172 may perform any of the exemplary processes described herein to maintain the existing ability of executed third-party application engine 112 to access confidential data maintained by custodian system 130 and other custodian systems within environment 100, or to remove one or more of the previously imposed restrictions or limitations on the ability of executed third-party application engine 112 to access confidential data. Executed dynamic consent engine 172 may generate one or more additional elements of modified permissioning data 276 indicative of the maintained access or the removed restrictions or limitations.

In other examples, dynamic consent engine 172 may generate modified permissioning data 276 not on the basis of locally maintained evaluation data, but instead based on an execution of one or more distributed smart contract recorded immutably within distributed ledger 180, e.g., within smart contract ledger blocks 296. By way of example, smart contract ledger blocks 296 may include a distributed consent engine 298 that, when executed by one or more of peer systems 190, including peer system 192 (e.g., by one or more processors or through an instantiated virtual machine), performs operations that modify dynamically the prior determination (e.g., by CA system 160) that executed third-party application engine 112 will manage the requested confidential data in accordance with a level or type of consent granted by user 101 and in accordance with terms or conditions imposed by custodian system 130, and further, that generate elements of modified permissioning data 276 indicative of a newly imposed, or modified, restrictions or limitations on the ability of executed third-party application engine 112 to access confidential data, e.g., based on elements local re-evaluation data 299 recorded onto the distributed ledger.

Although not illustrated in FIG. 2C, executed dynamic consent engine 172 may broadcast predicted outcome data 272 and a contract identifier that uniquely identifies the distributed smart contract within the distributed ledger across network 120 to one or more of peer systems 190, including peer system 192. By way of example, upon detection of the contract identifier, peer system 192, and others of peer systems 190, may execute distributed consent engine 298 and perform consensus-based operations that modify dynamically the prior determination that executed third-party application engine 112 will manage the requested confidential data in accordance with the granted consent granted and with the imposed terms or conditions and generate corresponding elements of modified permissioning data 276 using any of the exemplary processes described herein. The one or more of peer systems 190, including peer systems 192, may perform further consensus-based operations to broadcast modified permissioning data 276 across network 120 to CA system 160, e.g., via a secure programmatic interface established and maintained by dynamic consent engine 172.

Referring back to FIG. 2C, executed dynamic consent engine 172 may perform operations that store modified permissioning data 276 within corresponding portions of a locally accessible or cloud-based data repository or database. For example, as illustrated in FIG. 2C, executed dynamic consent engine 172 may perform operations that store modified permissioning data 276 within the structured or unstructured data records of permissioning database 166, e.g., in conjunction with access credential 220. In some instances, permissioning database 166 may also maintain elements of additional permissioning data that identify one or more prior restrictions or prior limitations imposed on third-party application engine 112 by CA system 160 over one or more prior temporal intervals, and further, which collectively establish a time-evolving record of these imposed restrictions or limitations across multiple temporal intervals.

Executed dynamic consent engine 172 may also perform operations that cause CA system 160 to transmit modified permissioning data 276 across network 120 to custodian system 130, e.g., alone or in a data package 280 that includes access credential 220. In some instances, not illustrated in FIG. 2C, executed dynamic consent engine 172 may perform additional operations that apply a digital signature to access credential 220 and to modified permissioning data 276, e.g., using any appropriate digital signature algorithm using a private cryptographic key of CA system 160, and may transmit data package 280, which includes access credential 220, modified permissioning data 276, the applied digital signature, and a public key certificate of CA system 160 (e.g., that include a public cryptographic key of CA system 160), across network 120 to custodian system 130. As illustrated in FIG. 2C, custodian system 130 may receive data package 280, e.g., via the programmatic interface, and executed data provisioning engine 140 may receive data package 280, validate the applied digital signature (e.g., based on the public cryptographic key of CA system 160), and store the access credential 220 and modified permissioning data within a tangible, non-transitory memory, e.g., within a portion of consent data store 138 (not illustrated in FIG. 2C).

In other exemplary embodiments, CA system 160 may perform operations that record modified permissioning data 276 within one or more ledger blocks of an immutable and cryptographically secure distributed ledger. In one instance, CA system 160 may perform operations that establish and maintain distributed ledger 180, and broadcast updated versions of distributed ledger 180 to one or more computing systems that participate in the permissioned distributed-ledger network described herein, including custodian system 130 and other computing systems operating within environment 100. For example, CA system 160 may perform operations that record access credential 220, modified permissioning data 276, a digital signature, a public key certificate of CA system 160, and a corresponding hash value within an additional ledger block of an updated distributed ledger (e.g., that includes prior ledger block 228), and that broadcast the updated distributed ledger across network 120 to custodian system 130, to the other custodian systems, and to other computing systems that participate in the permissioned, distributed-ledger network, e.g., for storage within corresponding tangible, non-transitory memories.

In other instances, described below in reference to FIG. 2D, CA system 160 may, in conjunction with each of peer systems 190 (including peer system 192), perform consensus-based operations that generate and broadcast updated versions of distributed ledger 180 to the one or more computing systems that participate in the permissioned distributed-ledger network described herein. For example, and referring to FIG. 2D, executed dynamic consent engine 172 may provide modified permissioning data 276 as an input to a block generation module 279, which when executed by the one or more processors of CA system 160, may perform operations that apply a digital signature 278A to access credential 220 and to modified permissioning data 276, e.g., using any appropriate digital signature algorithm using a private cryptographic key of CA system 160. Further, executed block generation module 279 may perform additional operations that generate a hash value 278C based on an application of one or more appropriate hash algorithms to all or a portion of access credential 220, modified permissioning data 276, digital signature 278A, and a public key certificate 278B of CA system 160 (e.g., that include a public cryptographic key of CA system 160).

For instance, executed block generation module 279 may package access credential 220, modified permissioning data 276 into corresponding portions of a recordation request 283, and may perform operations that cause CA system 160 to broadcast each of one or more recordation request 283 across network 120 to each of peer systems 190, including peer system 192.

Figure 2D:
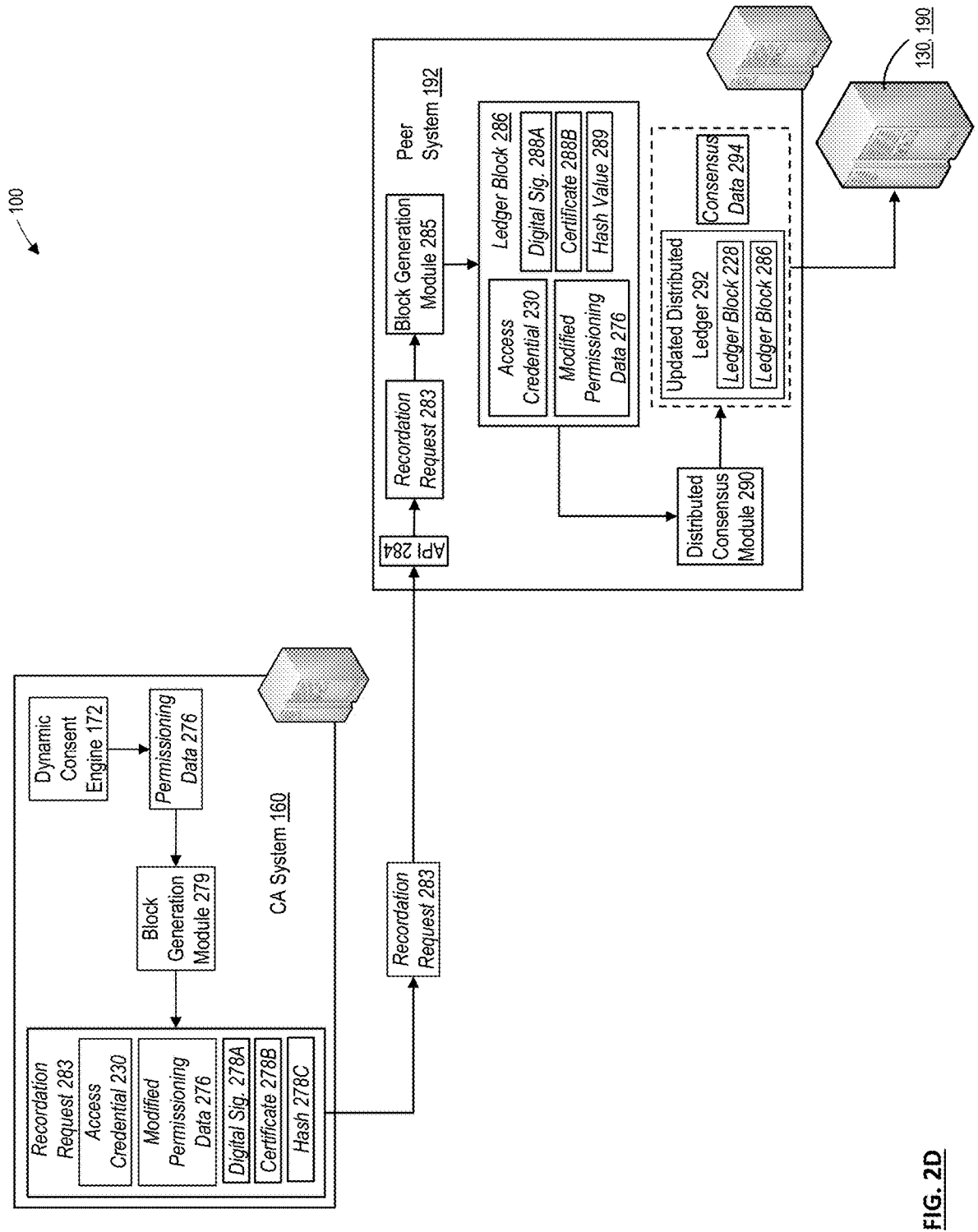

Referring to FIG. 2D, a programmatic interface of peer system 192 (and each additional or alternate one of peer systems 190), such as application programming interface (API) 284 may receive recordation request 283, which includes access credential 220 and modified permissioning data 276, and may route recordation request 283 to a block generation module 285. When executed by the one or more processors of peer system 192 (and each additional or alternate one of peer systems 190), block generation module 285 may perform operations that generate a new ledger block 286 that includes access credential 220 and modified permissioning data 276.

For instance, block generation module 285 performs operations that generate a digital signature 288A based on access credential 220 and modified permissioning data 276 (e.g., using a corresponding private cryptographic key of peer system 192), and may generate a hash value 289 based on an application of any appropriate hash algorithm described herein to access credential 220, modified permissioning data 276, and digital signature 288A, either alone or in conjunction with a public key certificate 288B of peer system 192 (which includes a corresponding public cryptographic key). In some instances, block generation module 285 may package access credential 220 and modified permissioning data 276 into ledger block 286, along with digital signature 288A, public key certificate 288B, and hash value 289.

Peer system 192 (and each additional or alternate one of peer systems 190) may perform additional operations that append to ledger block 286 to a prior version of distributed ledger 180 to generate a latest, longest version of the permissioned distributed ledger (e.g., an updated distributed ledger 292). For example, the additional operations may be established through a distributed consensus among additional ones of peer systems 190, and may include, but are not limited to, the calculation of an appropriate proof-of-work or proof-of-stake by a distributed consensus module 290 prior to the other peer systems. In certain aspects, peer system 192 may broadcast evidence of the calculated proof-of-work or proof-of-stake to the additional ones of peer systems 190 across network 120 (e.g., as consensus data 294).

Peer system 192 may also broadcast updated distributed ledger 292, which represents the latest, longest version of the distributed ledger, to the additional ones of peer systems 190 operating within environment 100 and additionally or alternatively, to each of the network-connected systems that participate in the distributed-ledger network, such as custodian system 130, CA system 160, and the other custodian and CA systems operating within environment 100, through a secure, programmatic interface. In some instances, not illustrated in FIG. 2D, custodian system 130 and CA system 160 may perform operations that store updated distributed ledger 292 within respective portions of data repository 132 and/or data repository 162, e.g., to replace corresponding ones of distributed ledger 180.

Figure 3:
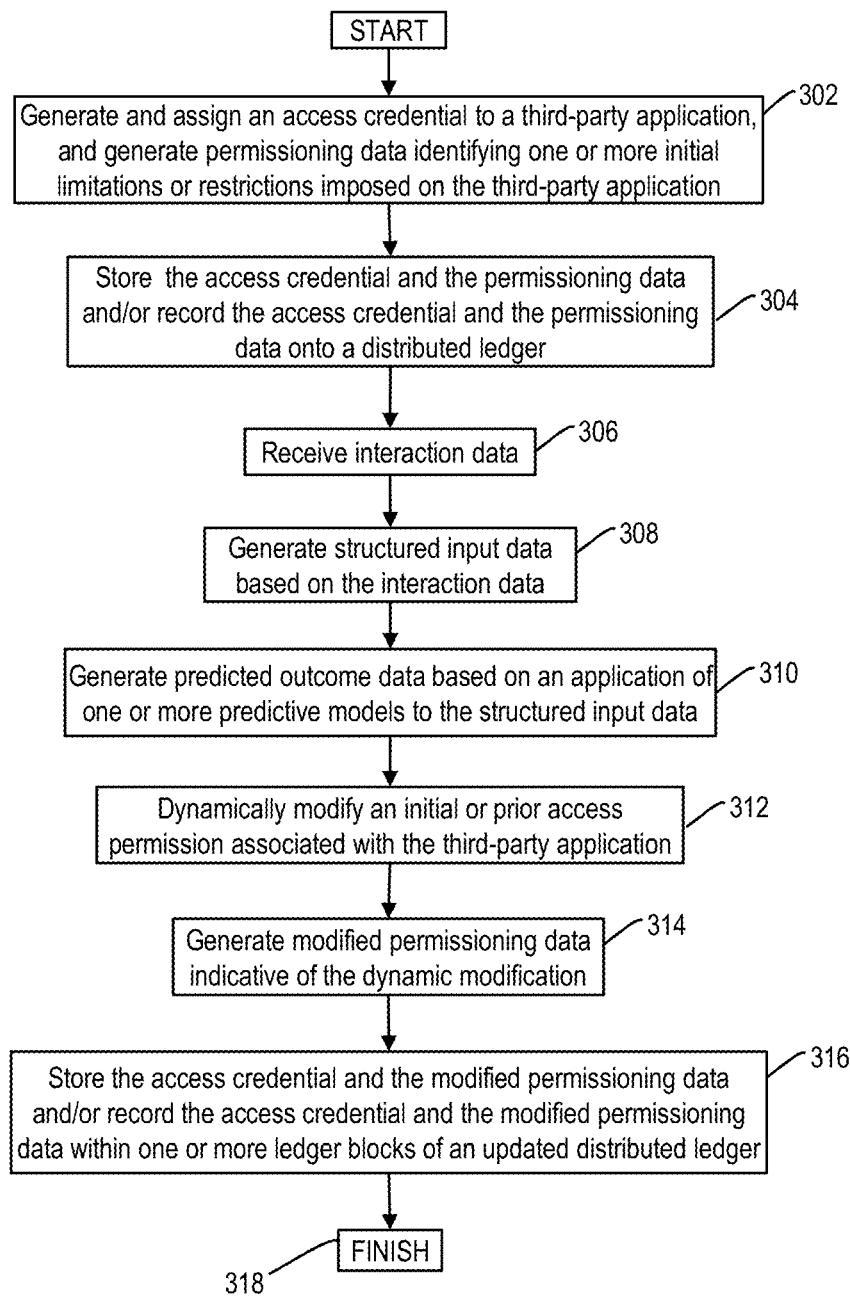
FIGS. 3 and 4 are flowcharts of exemplary processes for dynamically managing consent and permissioning between programmatic interfaces and unrelated third-party applications within a computing environment, in accordance with some embodiments.

FIG. 3 is a flowchart of an exemplary process 300 for dynamically managing consent and permissioning between programmatic interfaces and unrelated third-party applications within a computing environment, in accordance with disclosed exemplary embodiments. In some instances, a computing system associated or operated by any of the centralized authorities described herein, such as centralized authority (CA) system 160 of FIG. 1, may perform one or more steps of exemplary process 300.

Referring to FIG. 3A, CA system 160 may perform operations that generate and assign an application-specific access credential to an application program executed by a third-party system, such as third-party application engine 112 executed by third-party system 110 of FIG. 1 (e.g., in step 302). As described herein, the generated access credential may be indicative of, and responsive to, an initial determination that third-party application engine 112 will manage confidential user data in accordance with a level or type of consent granted by a corresponding user (e.g., through a token-based authentication and consent process, such as an OAuth consent protocol) and further, in accordance with one or more terms and conditions imposed on the confidential data by custodian system 130. Examples of the generated and assigned access credential include, but are not limited to, a digital token, cryptogram, hash value, or other element of cryptographic data that uniquely identifies executed third-party application engine 112.

In some instances, the initial determination by CA system 160 in step 302 may be based on a determination that, using any of the exemplary processes described herein, a status of a third-party entity (e.g., that operates, or is associated with, third-party system 110) before a legal, regulatory, or governmental entity comports with certain threshold requirements. Further, and in addition to generating and assigning the application-specific access credential to third-party application engine 112, CA system 160 may also perform any of the exemplary processes described herein to generate permissioning data identifying one or more initial restrictions or limitations on an ability of third-party application engine 112 to access the confidential data maintained by the custodian systems, or alternatively, confirming a lack of any initially imposed limitations or restrictions (e.g., also in step 302). As described herein, examples of these restrictions or limitations could include a temporal restriction, a data-specific restriction (e.g., that excludes specific elements of classes of data, etc.), or a custodian-specific restriction (e.g., that excludes confidential data maintained by certain custodian systems, etc.).

CA system 160 may also perform any of the exemplary processes described herein to store the access credential and the generated permissioning data within one or more locally accessible or cloud-based data repositories, and additionally, or alternately, to record immutably the access credential and the generated permissioning data within one or more ledger blocks of a cryptographically secure distributed ledger, e.g., alone or through an implementation of consensus-based operations in conjunction with one or more peer systems, such as peer systems 190 of FIG. 1 (e.g., in step 304). By way of example, CA system 160, custodian system 130, and one or more additional, or alternate, custodian or centralized-authority computing systems may collective establish, and participate in, a distributed-ledger network, and the distributed ledger, with includes the ledger blocks recording the access credential and the permissioning data, may be available to the each of the computing systems that participate in the distributed-ledger network, as described herein. In other examples, also in step 304, CA system 160 may perform operations that transmit the access credential and the generated permissioning data to custodian system 130, which may store the access credential and the generated permissioning data within a locally accessible or cloud-based data repository.

In some instances, CA system 160 may receive interaction data characterizing an interaction between executed third-party application engine 112 and secure, programmatic interfaces established and maintained by one or more custodian systems, such as API 222 of custodian system 130 of FIG. 2A (e.g., in step 306). By way of example, the received elements of interaction may be indicative of a request, by executed third-party application engine 112, for one or more elements of confidential data maintained by custodian system 130, such as, but not limited to, the requested account balance of the credit card account held by user 101, and executed third-party application engine 112 may perform operations generate and transmit the request to API 222 established and maintained by custodian system 130.

Further, and as described herein, the CA system 160 may receive one or more elements of interaction data from each of the one or more custodian systems operating within the distributed environment, e.g., custodian system 130. By way of example, the elements of the interaction data received from custodian system 130 (e.g., that correspond to a request by executed third-party application engine 112 for an account balance maintained by custodian system 130 on behalf of user 101) may include, but are not limited to, a unique network address of third-party system 110 (e.g., that executes third-party application engine 112), one or more identifiers of the requested elements of confidential data, an application-specific access credential and OAuth token received by custodian system 130 from executed third-party application engine 112, temporal data 260 which identifies a time or date at which custodian system 130 received the request, and a unique identifier of API 222 of custodian system 130, such an IP address.

In some instances, CA system 160 may perform any of the exemplary processes described herein that generate an element of structured input data that includes one or more elements of the received interaction data, and one or more values derived from the received interaction data (e.g., in step 308). In step 310, CA system 160 may generate elements of predicted outcome data based on application of one or more of the exemplary predictive models described herein to all, or a selected portion, of the structured input data. CA system 160 may also operations that the structured input data and the predicted outcome data within one or more locally accessible or cloud-based data repositories, e.g., for subsequent training of the predictive models described herein.

The one or more exemplary predictive models applied may include, but are not limited to, a deterministic statistical process, a stochastic statistical process, a machine learning process, or an artificial intelligence model. For example, the deterministic statistical processes can include, but are not limited to, an index based on certain parameter values, a linear regression model, a nonlinear regression model, a multivariable regression model, and additionally, or alternatively, a linear or nonlinear least-squares approximation. Examples of the stochastic statistical process can include, among other things, a support vector machine (SVM) model, a multiple regression algorithm, a least absolute selection shrinkage operator (LASSO) regression algorithm, or a multinomial logistic regression algorithm, and examples of the machine learning processes can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms).

Further, the artificial intelligence models may include, but are not limited to, an artificial neural network model, a recurrent neural network model, a Bayesian network model, or a Markov model. By way of example, and as described herein, CA system 160 may include distributed computing components that represent corresponding input nodes of an initial layer of an artificial neural network model, and each of the nodes of the artificial neural network model may be configured to receive a corresponding element of the structured input data, as described herein. The artificial neural network model may also include one or more subsequent, layers of intermediate nodes (e.g., established by and corresponding to additional or alternate ones of the distributed computing components of CA system 160), which may be interconnected to the input nodes and further, which may be interconnected to an output node within a final output later of the artificial neural network model. In some instances, the output node (e.g. established by and corresponding to a further one of the distributed computing components of CA system 160) may be configured to the generate predicted output data.

As described herein, the predicted outcome data may be indicative of a likelihood that executed third-party application engine 112 will manage the requested elements of confidential data specified in accordance with the level or type of access granted by user 101 (e.g., via the OAuth token) and with the one or more terms or conditions imposed by custodian system 130. The predicted outcome data may, for instance, correspond to a binary value, e.g., unity for misuse or breach, or zero for no misuse or no breach, or may correspond to a non-binary value indicative of a likelihood of breach.

As described herein, one or more of these stochastic statistical processes, machine learning algorithms, or artificial intelligence models can be trained against, and adaptively improved using, additional elements of structured input data (e.g., "training" data) having a specified structure and composition, corresponding elements of predicted outcome data, and elements of actual outcome data characterizing that characterize an occurrence, or lack, or a reported misuse or breach. For example, the elements of actual outcome data may be received from custodian system 130, from other custodian systems, or from computing systems operated regulatory, legal, or governmental entities. Further, one or more of these stochastic statistical processes, machine learning algorithms, or artificial intelligence models can be deemed successfully trained and ready for deployment when a model accuracy (e.g., as established based on a comparison with the actual outcome data), exceeds a threshold value.

Referring back to FIG. 3, CA system 160 may also perform any of the exemplary processes described herein to modify dynamically an initial or a prior determination (e.g., an initial or prior access permission established by CA system 160) that executed third-party application engine 112 will manage the requested elements of confidential data in accordance with a level or type of consent granted by user 101 and further, in accordance with one or more terms or conditions by custodian system 130 (e.g., in step 312). By way of example, and as described herein, CA system 160 may access, within a data repository, re-evaluation data that specifies predetermined criteria triggering a re-evaluation of an ability or permission of executed third-party application engine 112 to access elements of confidential data, and CA system 160 may perform operations that dynamically modify the initial or prior determination based on the application of the predetermined criteria to the predicted output data.

By way of example, the dynamic modification to the initial or prior determination may include a temporary or permanent revocation of access to confidential data by executed third-party application engine 112, an imposition of a limitation on the access to confidential data by executed third-party application engine 112 on a temporary or a permanent basis (e.g., a revocation of access to certain elements, types, or sources of the confidential data), or a lifting or an easing of a previously imposed revocation or limitation. In some instances, CA system 160 may perform operations that generate one or more elements of modified permissioning data indicative of the permanent or temporary revocation, of the temporary or permanent imposition of the limitation, or the lifting or easing of the previously imposed revocation of limitation (e.g., in step 314).

In some instances, CA system 160 may also perform any of the exemplary processes described herein to store the access credential and the generated elements of modified permissioning data within a corresponding portion of a locally accessible or cloud-based data repository, such as, but not limited to, permissioning database 166 (e.g., in step 316). In other instances, also in step 316, CA system 160 may perform any of the exemplary processes described herein to record the access credential of executed third-party application engine 112 and the generated permissioning data within an additional ledger block of the distributed ledger. In one example, in step 316, CA system 160 may perform operations that establish and maintain the distributed ledger, and that broadcast an updated version of the distributed ledger, which records the access credential and the permissioning data within the additional ledger block, to one or more computing systems that participate in the permissioned distributed-ledger network described herein, including custodian system 130 and other custodian systems. In other examples, in step 316, CA system 160 may, in conjunction with peer systems 190, perform consensus-based operations that generate and broadcast updated versions of the distributed ledger 180 to the one or more computing systems that participate in the permissioned distributed-ledger network described herein. Exemplary process 300 is complete in step 318.

Figure 4:
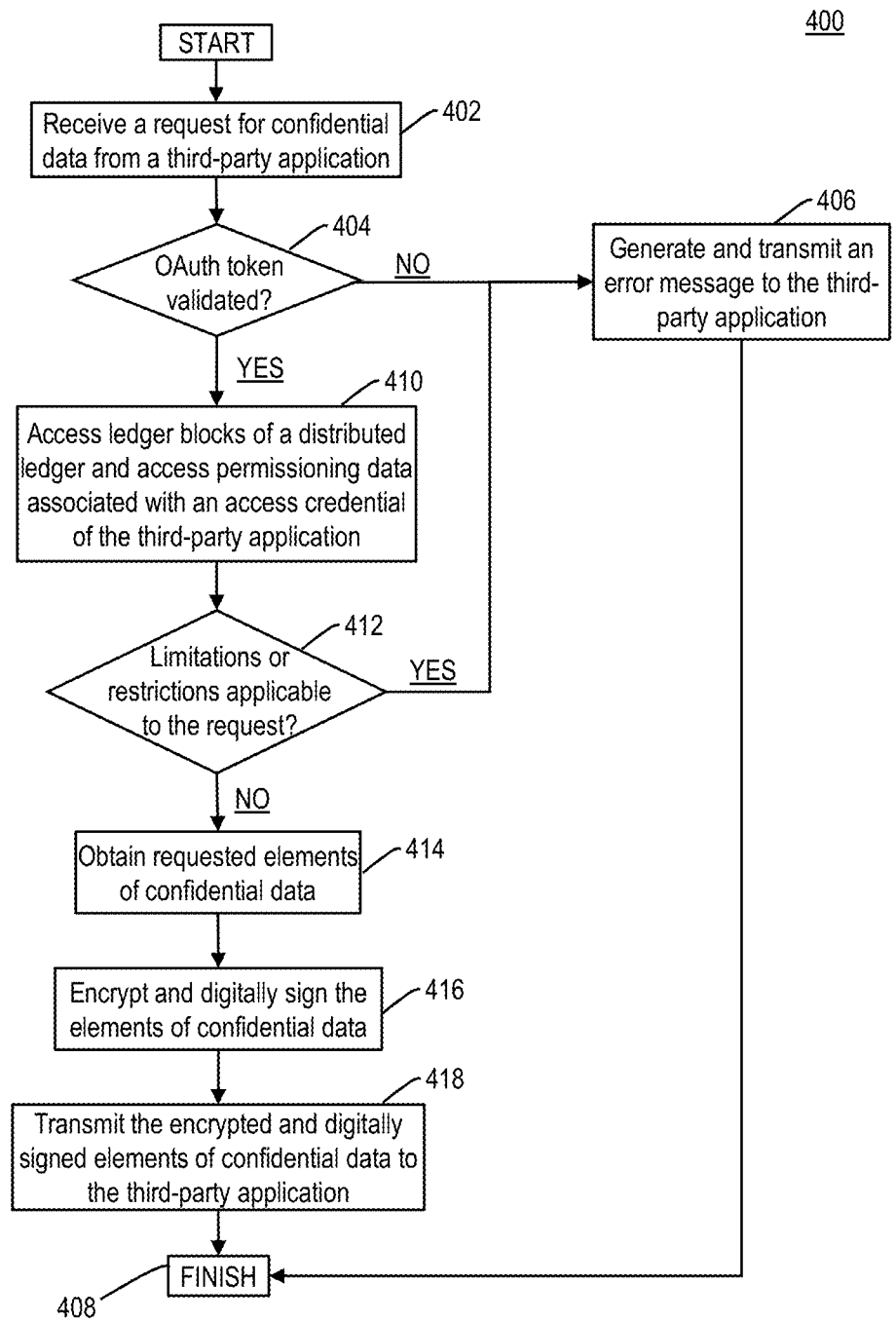

FIG. 4 is a flowchart of an exemplary process 400 for dynamically managing consent and permissioning between programmatic interfaces and unrelated third-party applications within a computing environment, in accordance with disclosed exemplary embodiments. In some instances, a computing system associated or operated by a custodian of confidential data, such as custodian system 130 of FIG. 1, may perform one or more steps of exemplary process 400.

Referring to FIG. 4, custodian system 130 may receive data requesting one or more elements of confidential data maintained within a local data repository or within an accessible could-based data repository (e.g., in step 402). In some instances, the received data may be generated by executed third-party application engine 112, and the received data may include one or more identifiers of the requested data (e.g., the requested account balance of the credit card account issued to user 101), and OAuth token generated through any of the exemplary token-based authentication and consent protocols described (e.g., an OAuth protocol implemented collectively by client device 102, third-party system 110, and custodian system 130), and an access credential generated by and assigned to executed third-party application engine 112 by CA system 160 using any of the exemplary processes described herein.

In some instances, custodian system 130 may perform operations that validate the received OAuth token against a locally maintained copy of the OAuth token generated during any of the exemplary token-based authentication and consent protocols described herein (e.g., in step 404). If, for example, custodian system 130 were to detect an inconsistency between the received OAuth token and the locally maintained OAuth token, custodian system 130 may decline to validate the received OAuth token and may decline to provision the requested elements of confidential data to executed third-party application engine 112 (e.g., step 404; NO). Responsive to the detected inconsistency, custodian system 130 may generate and transmit an error message indicative of the failed verification process to third-party system 110 (e.g., in step 406), and exemplary process 400 is complete in step 412.

Alternatively, if custodian system 130 were to establish a consistency between the received OAuth token and the locally maintained OAuth token (e.g., step 404; YES), custodian system 130 may perform additional operations that determine whether executed third-party application engine 112 should be trusted to manage the requested elements of confidential data in accordance with the user-specified consent (e.g., based on the received OAuth token) and/or terms and conditions imposed by custodian system 130. By way of example, and as illustrated in FIG. 4, custodian system 130 access distributed ledger 180 maintained within a local or cloud-based data repository, and perform any of the exemplary processes described herein to identify a latest and most temporally recent ledger block that includes the received access credential, and to obtain permissioning data identifying one or more restrictions or limitations (or alternatively, no restrictions or limitations) on an ability of executed third-party application engine 112 to access confidential data (e.g., in step 410).

Based on the recorded elements of permissioning data, custodian system 130 may perform any of the exemplary processes described herein to determine whether any of the one or more restrictions or limitations are applicable to the request for the elements of confidential data received from executed third-party application engine 112 and as such, to determine whether third-party application engine 112 should be trusted to manage the requested elements of confidential data in accordance with the previously granted level or type of access (e.g., as confirmed via the validated OAuth token) and in accordance with the terms and restrictions imposed by custodian system 130 (e.g., in step 412). By way of example, if custodian system 130 were to establish that one or more of the restrictions or limitations are applicable to the received request, the requested elements of confidential data, or executed third-party application engine 112 (e.g., step 412; YES), custodian system 130 may decline to provision the requested elements of confidential data to executed third-party application engine 112, and may generate and transmit an error message indicative of the failed verification process to third-party system 110 (e.g., in step 406). Exemplary process 400 is complete in step 412.

Alternatively, if custodian system 130 were to determine that the recorded elements of permissioning data fail to specify any restrictions or limitations, or that none of the restrictions or limitations are applicable to the received request, the requested elements of confidential data, or executed third-party application engine 112 (e.g., step 412; NO), custodian system 130 may perform any of the exemplary processes described herein to access and extract the requested elements of confidential data from one or more locally accessible or cloud-based data repositories (e.g., in step 414). Custodian system 130 may also perform any of the exemplary processes described herein to operations that encrypt the extracted elements of confidential data sing a public cryptographic key of executed third-party application engine 112 and in some instances, apply a digital signature to the encrypted elements of confidential data using a private cryptographic key of custodian system 130 (e.g., in step 416).

Custodian system 130 may perform any of the exemplary processes described herein to transmit the encrypted elements of confidential data (and in some instances, the applied digital signature and a public key certificate of custodian system 130) across network 120 to third-party system 110, e.g., via a secure, programmatic interface of executed third-party application engine 112 (e.g., in step 418). Further, custodian system 130 may also perform any of the exemplary processes described herein to generate one or more elements of interaction data that characterize an interaction between executed third-party application engine and a secure, programmatic interface of custodian system 130 (e.g., through the received request for the confidential data), and that transmit the interaction data across network 120 to CA system 160 (e.g., in step 420). Exemplary process 400 is then complete in step 408.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, third-party application engine 112, data provisioning engine 140, verification module 142, extraction module 144, encryption module 146, application programs 167, conversion engine 168, predictive engine 170, dynamic consent engine 172, APIs 210, 222, 246, 264, and 284, validation module 212, aggregation module 214, management module 266, block generation module 279, block generation module 285, and distributed consensus module 290, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a memory storing instructions; and
at least one processor coupled to the communications unit and the memory, the at least one processor being configured to execute the instructions to:
obtain interaction data that identifies an interaction between an application program executed at a first computing system and a programmatic interface of a second computing system, the interaction comprising a request to access an element of data, and the request being generated by the executed application program of the first computing system and received by the programmatic interface of the second computing system;

based on the interaction data, generate outcome data characterizing a probability that a management of the requested element of data, by the first computing system, is inconsistent with an access permission granted to the executed application program of the first computing system;

modify the access permission in accordance with the outcome data; and perform operations that generate permissioning data indicative of the modified access permission and that store the permissioning data within the memory.

2. The apparatus of claim 1, wherein the at least one processor is further configured to execute the instructions to receive the interaction data from the second computing system via the communications interface.

3. The apparatus of claim 1, wherein the interaction data comprises at least one of an identifier of the first computing system, an identifier of the programmatic interface, an access credential associated with the executed application program, an OAuth token, an identifier of the data element, and temporal information associated with the received request.

4. The apparatus of claim 3, wherein the at least one processor is further configured to execute the instructions to:

generate structured input data based on the interaction data, the structured input data having a predetermined composition and format; and generate the outcome data based on an application of at least one of a statistical process, a machine learning process, or an artificial intelligence process to the structured input data.

5. The apparatus of claim 4, wherein:

the structured input data comprises (i) one or more first elements of the interaction data and (ii) a value derived from one or more second elements of the interaction data;

the one or more first elements of interaction data comprise at least one of the identifier of the first computing system, the identifier of the programmatic interface, or the identifier of the data element;

the one or more second elements of interaction data comprise the temporal information associated with the received request; and the derived value comprises a frequency at which the executed application program requests access to the programmatic interface over one or more temporal intervals.

6. The apparatus of claim 1, wherein:

the interaction data comprises an access credential associated with the executed application program; and wherein the at least one processor is further configured to execute the instructions to:

load, from the memory, an additional element of the distributed ledger that includes the access credential; and access additional permissioning data within the distributed ledger, the additional permissioning data identifying the access permission.

7. The apparatus of claim 6, wherein:

the additional permissioning data comprises information that specifies one or more prior modifications to the access permission; and wherein the at least one processor is further configured to execute the instructions to modify the access permission in accordance with the generated outcome data and the information that specifies the one or more prior modifications to the access permission.

8. The apparatus of claim 1, wherein:

the outcome data comprises a numerical value indicative of the probability that the management of the requested element of data, by the first computing system, is inconsistent with granted access permission;

wherein the at least one processor is further configured to execute the instructions to:

determine that the numerical value exceeds a predetermined threshold value; and modify the access permission based on the determination that the numerical value exceeds the predetermined threshold value.

9. The apparatus of claim 1, wherein:

the at least one processor is further configured to execute the instructions to revoke the granted access permission based on the outcome data; and the permissioning data identifies the revocation of the granted access permission.

10. The apparatus of claim 1, wherein:

the at least one processor is further configured to execute the instructions to establish one or more limitations on the requested access to the element of data in accordance with the generated outcome data; and the permissioning data identifies the one or more established limitations.

11. The apparatus of claim 1, wherein the at least one processor is further configured to execute the instructions to perform additional operations that record the permissioning data within an element of a distributed ledger.

12. The apparatus of claim 11, wherein the at least one processor is further configured to execute the instructions to transmit, via the communications interface, the permissioning data to one or more peer systems, the peer systems being configured to record the permissioning data within the element of the distributed ledger.

13. A computer-implemented method, comprising:

obtaining, by at least one processor, interaction data that identifies an interaction between an application program executed at a first computing system and a programmatic interface of a second computing system, the interaction comprising a request to access an element of data, and the request being generated by the executed application program of the first computing system and received by the programmatic interface of the second computing system;

based on the interaction data, generating, by the at least one processor, outcome data characterizing a probability that a management of the requested element of data, by the first computing system, is inconsistent with an access permission granted to the executed application program of the first computing system;

modifying, by the at least one processor, the access permission in accordance with the outcome data; and by the at least one processor, performing operations that generate permissioning data indicative of the modified access permission and that store the permissioning data within a data repository.

14. The computer-implemented method of claim 13, wherein:

the obtaining comprises receiving the interaction data from the second computing system; and the interaction data comprises at least one of an identifier of the first computing system, an identifier of the programmatic interface, an access credential associated with the executed application program, an OAuth token, an identifier of the data element, and temporal information associated with the received request.

15. The computer-implemented method of claim 14, wherein generating the outcome data comprises:
  generating structured input data based on the interaction data, the structured input data having a predetermined composition and format, and the structured input data comprising (i) one or more first elements of the interaction data and (ii) a value derived from one or more second elements of the interaction data;
  applying at least one of a statistical process, a machine learning process, or an artificial intelligence process to the structured input data; and
  generating the outcome data based on the application of the at least one of the statistical process, the machine learning process, or the artificial intelligence process to the structured input data.

16. The computer-implemented method of claim 13, wherein:
  the interaction data comprises an access credential associated with the executed application program; and
  the method further comprises:
    obtaining, by the at least one processor, an additional element of the distributed ledger that includes the access credential; and
    accessing, by the at least one processor, additional permissioning data within the distributed ledger, the additional permissioning data identifying the access permission.

17. The computer-implemented method of claim 13, wherein:
  the outcome data comprises a numerical value indicative of the probability that the management of the requested element of data, by the first computing system, is inconsistent with granted access permission; and
  modifying the access permission comprises:
    determining that the numerical value exceeds a predetermined threshold value; and
    modifying the access permission based on the determination that the numerical value exceeds the predetermined threshold value.

18. The computer-implemented method of claim 13, wherein the computer-implemented method further comprises, by the at least one processor, performing additional operations that record the permissioning data within an element of a distributed ledger.

19. The computer-implemented method of claim 18, further comprising transmitting, by the at least one processor, the permissioning data to one or more peer systems, the peer systems being configured to record the permissioning data within the element of the distributed ledger.

20. A tangible, non-transitory computer-readable medium storing instructions that, when executed by at least one processor, cause the at least one processor to perform a method, comprising:
  obtaining interaction data that identifies an interaction between an application program executed at a first computing system and a programmatic interface of a second computing system, the interaction comprising a request to access an element of data, and the request being generated by the executed application program of the first computing system and received by the programmatic interface of the second computing system;
  based on the interaction data, generating outcome data characterizing a probability that a management of the requested element of data, by the first computing system, is inconsistent with an access permission granted to the executed application program of the first computing system;
  modifying the access permission in accordance with the outcome data; and
  performing operations that generate permissioning data indicative of the modified access permission and that store the permissioning data within a data repository.

* * * * *